United States Patent
Tang et al.

(10) Patent No.: US 9,654,263 B2
(45) Date of Patent: May 16, 2017

(54) METHOD, APPARATUS, AND SYSTEM FOR TRANSMITTING CONTROL INFORMATION

(71) Applicant: Huawei Technologies Co., Ltd., Shenzhen (CN)

(72) Inventors: Zhenfei Tang, Shanghai (CN); Yuanjie Li, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 117 days.

(21) Appl. No.: 14/611,783

(22) Filed: Feb. 2, 2015

(65) Prior Publication Data
US 2015/0146669 A1 May 28, 2015

Related U.S. Application Data

(63) Continuation of application No. PCT/CN2012/082147, filed on Sep. 27, 2012.

(30) Foreign Application Priority Data

Aug. 2, 2012 (CN) .................. PCTCN2012079607
Sep. 17, 2012 (CN) .................. PCTCN2012081510

(51) Int. Cl.
*H04L 5/00* (2006.01)
*H04W 72/04* (2009.01)

(52) U.S. Cl.
CPC .......... *H04L 5/0046* (2013.01); *H04L 5/0007* (2013.01); *H04L 5/0048* (2013.01); *H04L 5/0053* (2013.01); *H04W 72/042* (2013.01)

(58) Field of Classification Search
None
See application file for complete search history.

(56) References Cited

U.S. PATENT DOCUMENTS

| 2010/0195612 A1* | 8/2010 | Seo .................. H04L 1/0071 370/329 |
| 2011/0007674 A1 | 1/2011 | Dai et al. |

(Continued)

FOREIGN PATENT DOCUMENTS

| CN | 101159470 A | 4/2008 |
| CN | 101212416 A | 7/2008 |

(Continued)

OTHER PUBLICATIONS

"Need for Multiplexing Localized and Distributed ePDCCHs in one PRB," 3GPP TSG RAN WG1 #69, Prague, Czech Republic, R1-122743, 3rd Generation Partnership Project, Valbonne, France (May 21-25, 2012).

(Continued)

*Primary Examiner* — Edan Orgad
*Assistant Examiner* — Saumit Shah
(74) *Attorney, Agent, or Firm* — Leydig, Voit & Mayer, Ltd.

(57) ABSTRACT

Embodiments of the present invention disclose a method, an apparatus, and a system for transmitting control information. The method includes: determining enhanced resource element group numbers in resource blocks, and determining, according to the resource element group numbers, positions of resource elements corresponding to enhanced resource element groups; interleaving the enhanced resource element group numbers, and determining an enhanced control channel element; determining, according to the enhanced control channel element and the positions of the resource elements corresponding to the enhanced resource element groups, positions of resource elements corresponding to the enhanced control channel element; and transmitting corresponding control information on the positions of the resource elements corresponding to the control channel (Continued)

element. The present invention alleviates a problem that channel frequency diversity is poor, and lowers the probability of loss of information of a terminal device.

11 Claims, 26 Drawing Sheets

(56) References Cited

U.S. PATENT DOCUMENTS

| | | | |
|---|---|---|---|
| 2011/0007695 A1 | 1/2011 | Choi et al. | |
| 2011/0228729 A1 | 9/2011 | Dai et al. | |
| 2013/0044712 A1 | 2/2013 | Kim et al. | |
| 2013/0286967 A1 | 10/2013 | Ji et al. | |
| 2013/0301562 A1* | 11/2013 | Liao | H04W 72/042 370/329 |
| 2014/0286297 A1 | 9/2014 | Zhao et al. | |
| 2014/0348125 A1 | 11/2014 | Zhao et al. | |
| 2015/0078326 A1 | 3/2015 | Kim et al. | |
| 2015/0181573 A1 | 6/2015 | Takeda et al. | |
| 2015/0189640 A1* | 7/2015 | Lee | H04L 5/0053 370/329 |
| 2015/0295688 A1* | 10/2015 | Pan | H04B 7/0667 370/329 |

FOREIGN PATENT DOCUMENTS

| | | |
|---|---|---|
| CN | 101252422 A | 8/2008 |
| CN | 101594215 A | 12/2009 |
| CN | 101702644 A | 5/2010 |
| CN | 101895988 A | 11/2010 |
| CN | 101959307 A | 1/2011 |
| CN | 102082600 A | 6/2011 |
| CN | 102395206 A | 3/2012 |
| CN | 102420685 A | 4/2012 |
| CN | 102573094 A | 7/2012 |
| CN | 102611524 A | 7/2012 |
| CN | 102612094 A | 7/2012 |
| EP | 2779774 A1 | 9/2014 |
| EP | 2871894 A1 | 5/2015 |
| JP | 2014023108 A | 2/2014 |
| KR | 20110137751 A | 12/2011 |
| WO | WO 2009041770 A2 | 4/2009 |
| WO | 2011132946 A2 | 10/2011 |
| WO | WO 2011137383 A1 | 11/2011 |
| WO | WO 2011159132 A2 | 12/2011 |
| WO | WO 2014019286 A1 | 2/2014 |

OTHER PUBLICATIONS

"eREG and eCCE Definitions for ePDCCH," 3GPP TSG-RAN WG1 #69, Prague, Czech Republic, R1-122331, $3^{rd}$ Generation Partnership Project, Valbonne, France (May 21-25, 2012).

"$3^{rd}$ Generation Partnership Project; Technical Specification Group Radio Access Network; Evolved Universal Terrestrial Radio Access (E-UTRA); Physical Layer Procedures (Release 10)," 3GPP TS 36.213, V10.6.0, pp. 1-125, $3^{rd}$ Generation Partnership Project, Valbonne, France (Jun. 2012).

"$3^{rd}$ Generation Partnership Project; Technical Specification Group Radio Access Network; Evolved Universal Terrestrial Radio Access (E-UTRA); Multiplexing and Channel Coding (Release 10)," 3GPP TS 36.212, V10.6.0, pp. 1-79, $3^{rd}$ Generation Partnership Project, Valbonne, France (Jun. 2012).

"$3^{rd}$ Generation Partnership Project; Technical Specification Group Radio Access Network; Evolved Universal Terrestrial Radio Access (E-UTRA); Physical Channels and Modulation (Release 10)," 3GPP TS 36.211, V10.5.0, pp. 1-101, $3^{rd}$ Generation Partnership Project, Valbonne, France (Jun. 2012).

"Multiplexing of Localized and Distributed ePDCCH in Same PRBs," 3GPP TSG RAN WG1 Meeting #69, Prague, Czech Republic, R1-122499, $3^{rd}$ Generation Partnership Project, Valbonne, France (May 21-25, 2012).

"Consideration on e-PDCCH Search Space and Multipelxing Design," 3GPP TSG RAN WG1 Meeting #69, Prague, Czech Republic, R1-122721, $3^{rd}$ Generation Partnership Project, Valbonne, France (May 21-25, 2012).

"Discussion on eREG/eCCE Definition," 3GPP TSG RAN WG1 Meeting #69, Prague, Czech Republic, R1-122308, $3^{rd}$ Generation Partnership Project, Valbonne, France (May 21-25, 2012).

"DCI Multiplexing by eREG," 3GPP TSG-RAN WG1 #69, Prague, Czech Republic, R1-122001, $3^{rd}$ Generation Partnership Project, Valbonne, France (May 21-25, 2012).

"Details of Multiplexing of DCI Messages," 3GPP TSG-RAN WG1 #68bis, Jeju, Republic of Korea, R1-121023, $3^{rd}$ Generation Partnership Project, Valbonne, France (Mar. 26-30, 2012).

"Introduction of CR for Downlink DVRB Mapping to PRB," 3GPP TSG RAN WG1 #53, Kansas City, Kansas, R1-081818, $3^{rd}$ Generation Partnership Project, Valbonne, France (May 5-9, 2008).

"$3^{rd}$ Generation Partnership Project; Technical Specification Group Radio Access Network; Evolved Universal Terrestrial Radio Access (E-UTRA); Physical Channels and Modulation (Release 10)," 3GPP TS 36.211, V10.2.0, pp. 1-103, $3^{rd}$ Generation Partnership Project, Valbonne, France (Jun. 2011).

"$3^{rd}$ Generation Partnership Project; Technical Specification Group Radio Access Network; Evolved Universal Terrestrial Radio Access (E-UTRA); Multiplexing and channel coding (Release 10)," 3GPP TS 36.212, V10.6.0, pp. 1-78, $3^{rd}$ Generation Partnership Project, Valbonne, France (Jun. 2012).

"$3^{rd}$ Generation Partnership Project; Technical Specification Group Radio Access Network; Evolved Universal Terrestrial Radio Access (E-UTRA); Physical layer procedures (Release 10)," 3GPP TS 36.213, V10.6.0, pp. 1-124, 3¯Generation Partnership Project, Valbonne, France (Jun. 2012).

"Multiplexing of ePDCCH for different users," 3GPP TSG RAN WG1 Meeting #68bis, Jeju, Korea, R1-121288, 3rd Generation Partnership Project, Valbonne, France (Mar. 26-30, 2012).

"Views on Resource Mapping for ePDCCH," 3GPP TSG RAN WG1 Meeting #69, Prague, Czech Rrepublic, R1-121977, 3rd Generation Partnership Project, Valbonne, France (May 21-25, 2012).

"Definition of eCCE and eREG," 3GPP TSG-RAN WG1 Meeting #69, Prague, Czech Republic, R1-122360, 3rd Generation Partnership Project, Valbonne, France (May 21-25, 2012).

"Necessity of Multiplexing of Localized and Distributed ePDCCH Parts in the Same PRBs," 3GPP TSG-RAN WG1#69, Prague, Czech, R1-122168, 3rd Generation Partnership Project, Valbonne, France (May 21-25, 2012).

U.S. Appl. No. 14/611,837 (Downloaded from USPTO Nov. 21, 2016).

* cited by examiner

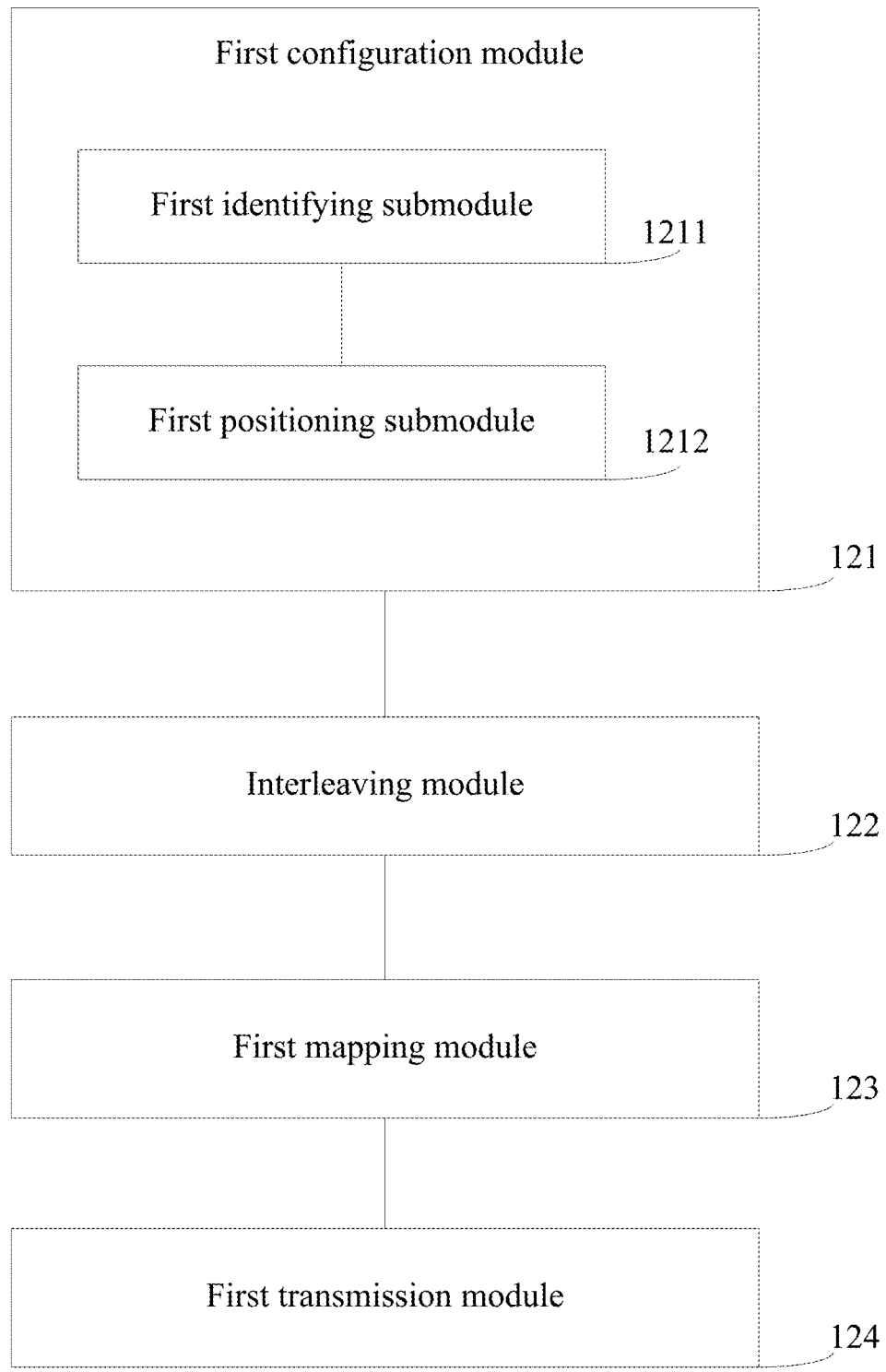
FIG. 12a1

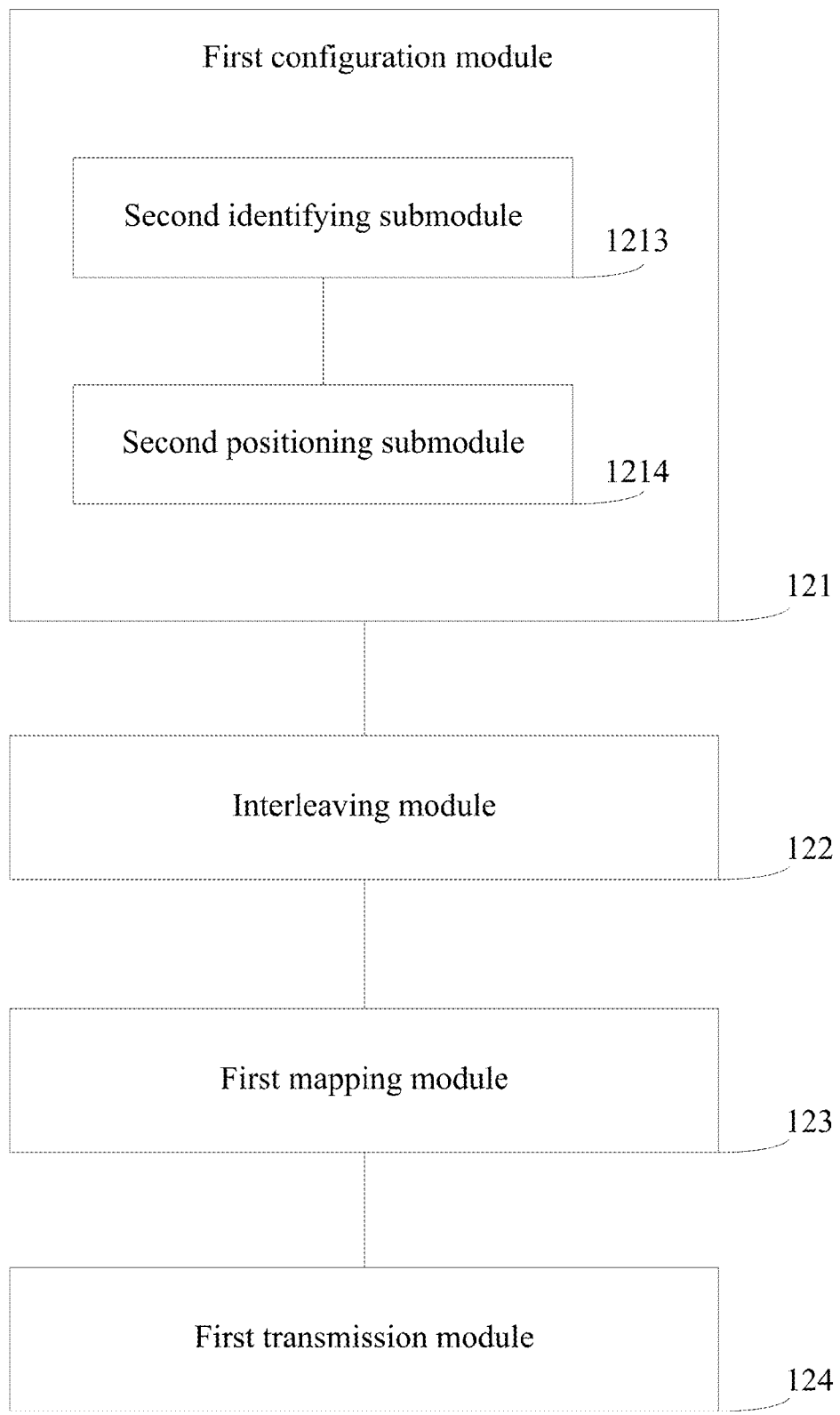
FIG. 12a2

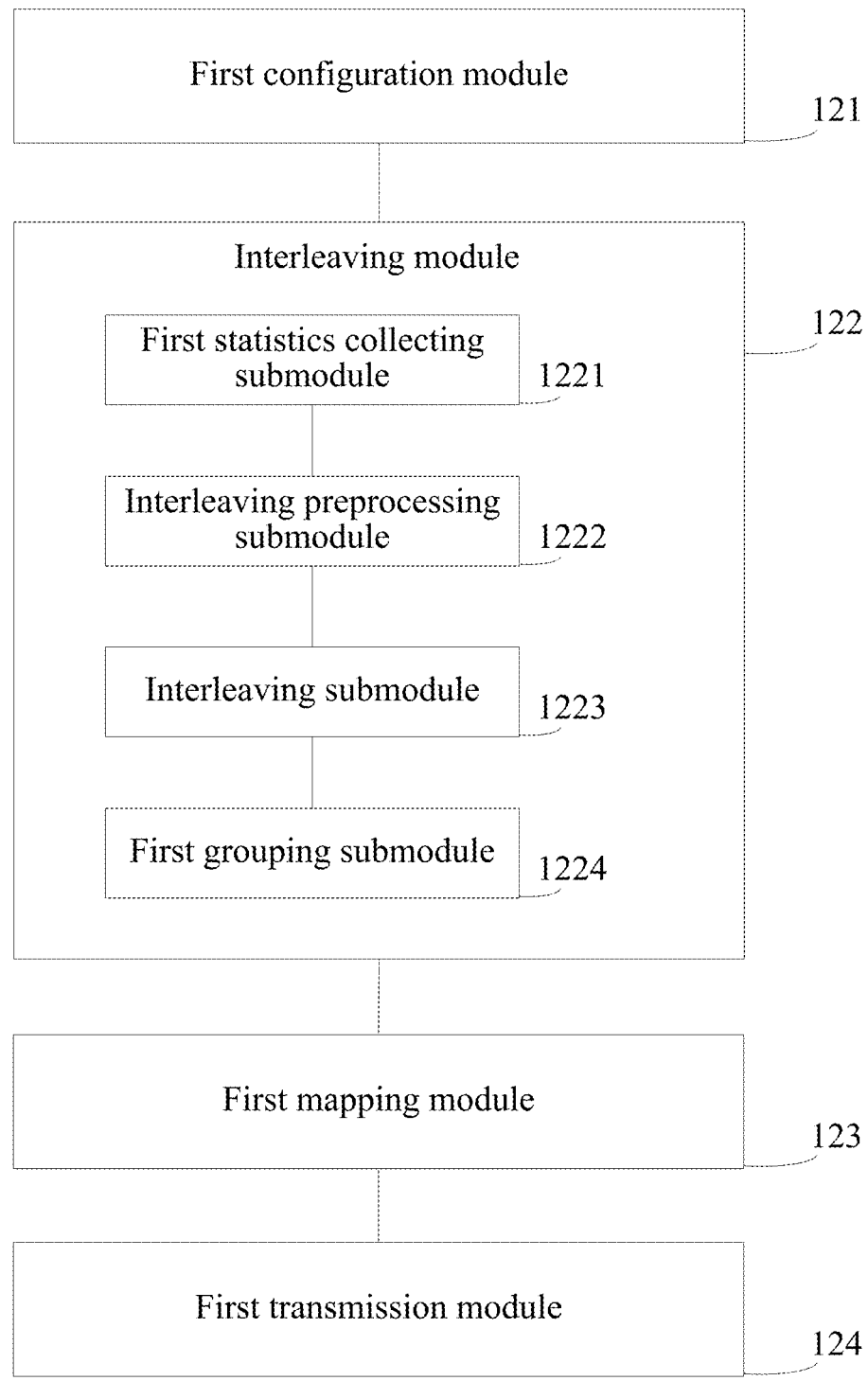
FIG. 12a3

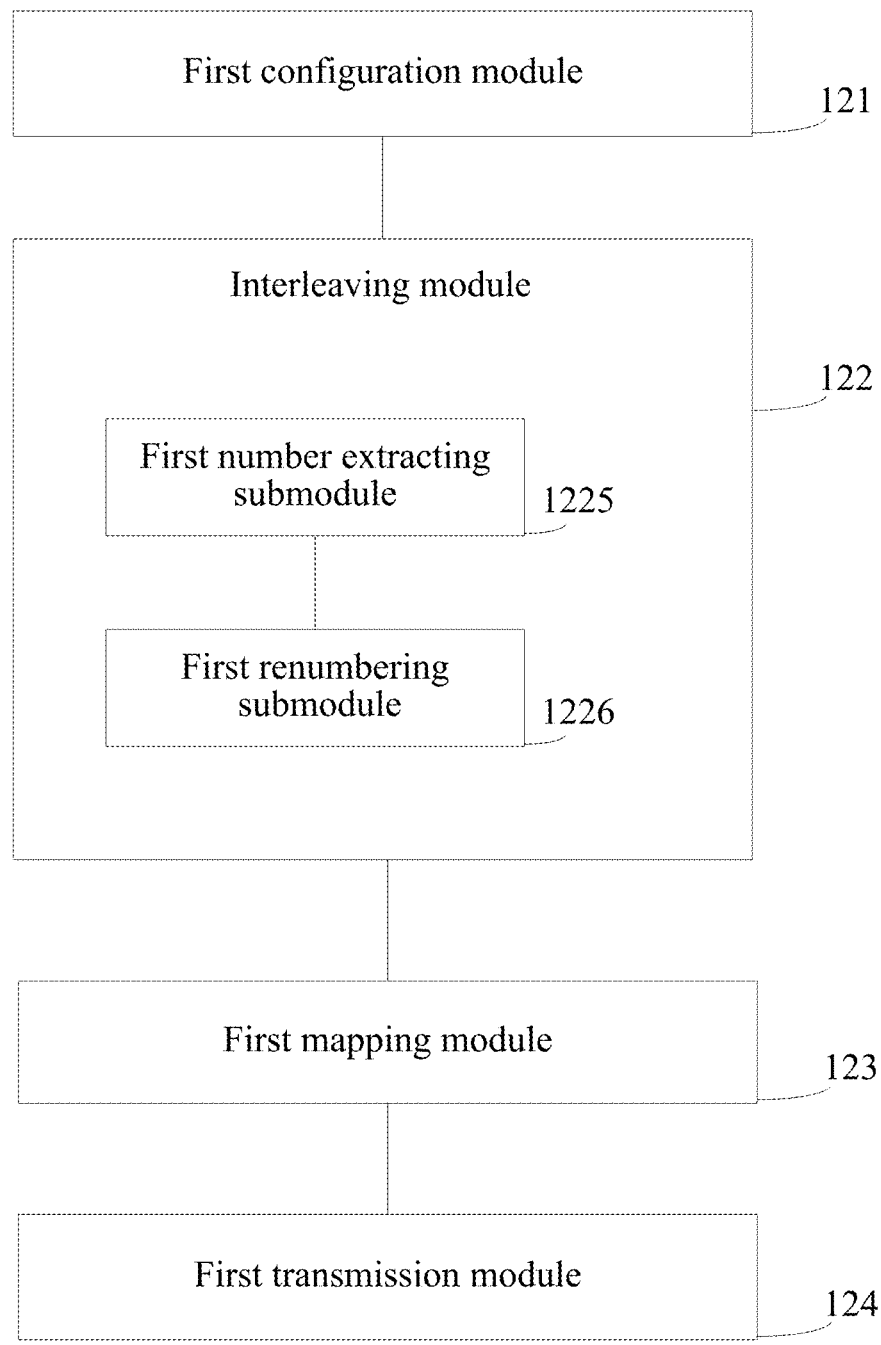
FIG. 12a4

METHOD, APPARATUS, AND SYSTEM FOR TRANSMITTING CONTROL INFORMATION

CROSS REFERENCE

The application is a continuation of International Patent Application No. PCT/CN2012/082147, filed on Sep. 27, 2012 which claims priority to International Application No. PCT/CN2012/079607, filed on Aug. 2, 2012, and International Application No. PCT/CN2012/081510, filed on Sep. 17, 2012, which are incorporated herein by references in their entireties.

TECHNICAL FIELD

The present invention relates to the field of wireless communications technologies, and in particular, to a method, an apparatus, and a system for transmitting control information.

BACKGROUND

In existing wireless communications technologies, OFDMA (orthogonal frequency division multiplexing access), as a mature downlink multiplexing access technology, is widely applied to communication systems, such as LTE/LTE-A. One feature of the technology is that: one RB (resource block) may be formed by multiple REs (resource elements), and each RE forming one RB may bear different information, for example:

As shown in FIG. 1a, when downlink data is transmitted on a PDCCH, REs in one RB may be assigned like this: various reference signals such as information in the PDCCH channel, a cell-level reference signal (CRS), a user-level reference signal, and a channel state information reference signal (CSI-RS) may be mapped to the REs of black parts in the RB shown in FIG. 1a.

The REs of white parts in the RB shown in FIG. 1a bear information of a control channel like a PDSCH or an ePDCCH, for example, control information of DCI. Further, the control information transmitted on the ePDCCH is mapped to a series of RBs by using an eREG as a basic resource unit, but the information processed by a device such as a base station in the wireless communication system is presented by an eCCE. One eCCE is formed by multiple eREGs, and the multiple eREGs forming one eCCE are from multiple RBs in the series of RBs. For example:

In the RB shown in FIG. 1b, non-marked parts are the REs corresponding to the configured eREGs in the RB. It should be noted that numbers in the figure are numbers of the eREGs in an actual application, for example: an eREG 0 is formed by REs numbered 0 in the non-marked parts. The number of REs corresponding to eREGs 0-7 is respectively 16, 12, 15, 14, 12, 13, 12, and 14, that is, a size of each eREG is different. The size of the maximal eREG is 16 REs, and the size of the minimal eREG is 12 REs, where a difference is four REs. Further, multiple corresponding eREGs in multiple RBs form one eCCE. For example, in the prior art, eREG 0 in RB0 and eREG 0 in RB1 form one eCCE together; and eREG 1 in RB 0 and eREG 1 in RB1 form another eCCE. Similarly, multiple eCCEs may be finally obtained, for example, eight eCCEs numbered from eCCE a0 to eCCE a7.

However, the inventor finds that the prior art has the following problem:

If the eREGs forming a same eCCE are from two adjacent RBs, for example, RB0 and RB1, it may be caused that channel frequency diversity of the two eREGs forming the eCCE is poor during a transmission process, while poor frequency diversity causes information being processed by a terminal device to get lost, for example, a bit error rate or block error rate of control information sent by a base station and received by the terminal device is relatively high, thereby lowering performance of the communication system. For example, in a case that information loss occurs, the base station needs to resend the information, thereby further the performance of the communication system.

SUMMARY

Embodiments of the present invention provide a method, an apparatus, and a system for transmitting control information, which can make a base station to interleave eREGs or group RBs before transmitting control information, so as to configure the eREGs forming a same eCCE to non-adjacent RBs, thereby alleviating a problem that channel frequency diversity is poor, lowering a probability of information loss of a terminal device, and improving performance of a communication system.

In order to achieve the foregoing objective, the embodiments of the present invention adopt the following technical solutions:

In one aspect, an embodiment of the present invention provides a method for transmitting control information, including:

determining enhanced resource element group eREG numbers in a resource block RB, and determining, according to the enhanced resource element group numbers in the resource block RB, positions of resource elements corresponding to enhanced resource element groups;

interleaving the enhanced resource element group numbers, and determining an enhanced control channel element eCCE according to at least two interleaved enhanced resource element groups;

determining, according to the enhanced control channel element and the positions of the resource elements corresponding to the enhanced resource element groups, positions of resource elements corresponding to the enhanced control channel element; and transmitting corresponding control information on the positions of the resource elements corresponding to the control channel element.

The interleaving the enhanced resource element group numbers includes:

determining an interleaver, where the number of rows or columns of the interleaver is the obtained amount of enhanced resource element groups in one resource block or a multiple of the amount, or the number of rows or columns of the interleaver is one of preset 4, 8, 12, 16, and 32; and interleaving the enhanced resource element group numbers in the resource block according to the interleaver.

In another aspect, an embodiment of the present invention provides a method for transmitting control information, including:

determining enhanced resource element groups eREGs in a resource block RB;

grouping resource blocks;

mapping the control information to the enhanced resource element groups in the grouped resource blocks; and transmitting the mapped control information.

The grouping resource blocks includes:

determining a virtual resource block DVRB number;

determining, according to the virtual resource block number, a physical resource block number N corresponding to an even time slot and a physical resource block number M corresponding to an odd time slot; and grouping the physical resource block number N corresponding to the even time slot and the odd time slot and the physical resource block number M corresponding to the even time slot and the odd time slot into the same group.

In still another aspect, an embodiment of the present invention provides a method for transmitting control information, including:

determining enhanced resource element group eREG numbers in a resource block RB, and determining, according to the enhanced resource element group numbers in the resource block RB, positions of resource elements corresponding to enhanced resource element groups;

determining an interleaver of the enhanced resource element group numbers, and determining, according to the interleaver, at least two enhanced resource element groups corresponding to an enhanced control channel element;

determining, according to the enhanced control channel element and the positions of the resource elements corresponding to the enhanced resource element groups, positions of resource elements corresponding to the enhanced control channel element; and receiving control information sent by a base station on the positions of the resource elements corresponding to the enhanced control channel element.

In still another aspect, an embodiment of the present invention provides a method for transmitting control information, including:

determining enhanced resource element group eREG numbers in a resource block RB, and determining, according to the enhanced resource element group numbers, positions of resource elements corresponding to enhanced resource element groups;

obtaining a grouping situation of the resource blocks performed by a base station;

determining, according to grouping of the resource blocks performed by the base station and the positions of the resource elements corresponding to the enhanced resource element groups, positions of resource elements corresponding to an enhanced control channel element in resource block groups; and receiving control information sent by the base station on the positions of the resource elements corresponding to the enhanced control channel element in the resource block groups.

In still another aspect, an embodiment of the present invention provides a base station device, including:

a first configuration module, configured to determine enhanced resource element group eREG numbers in a resource block RB, and determine, according to the enhanced resource element group numbers in the resource block RB, positions of resource elements corresponding to enhanced resource element groups;

an interleaving module, configured to interleave the enhanced resource element group numbers, and determine an enhanced control channel element eCCE according to at least two interleaved enhanced resource element groups;

a first mapping module, configured to determine, according to the enhanced control channel element and the positions of the resource elements corresponding to the enhanced resource element groups, positions of resource elements corresponding to the enhanced control channel element; and a first transmission module, configured to transmit corresponding control information on the positions of the resource elements corresponding to the control channel element.

In still another aspect, an embodiment of the present invention provides a base station device, including:

a second configuration module, configured to determine enhanced resource element groups eREGs in a resource block RB;

a resource block grouping module, configured to group resource blocks;

a second mapping module, configured to map control information to the enhanced resource element groups in the grouped resource blocks; and a second transmission module, configured to transmit the mapped control information.

In still another aspect, an embodiment of the present invention provides a terminal device, including:

a first position determining module, configured to determine enhanced resource element group eREG numbers in a resource block RB, and determine, according to the enhanced resource element group numbers in the resource block RB, positions of resource elements corresponding to enhanced resource element groups;

a first determining module, configured to determine an interleaver of the enhanced resource element group numbers, and determine, according to the interleaver, at least two enhanced resource element groups corresponding to an enhanced control channel element; determine, according to the enhanced control channel element and the positions of the resource elements corresponding to the enhanced resource element groups, positions of resource elements corresponding to the enhanced control channel element; and a first receiving module, configured to receive control information sent by a base station on the positions of the resource elements corresponding to the enhanced control channel element.

In still another aspect, an embodiment of the present invention provides a terminal device, including:

a second determining module, configured to determine enhanced resource element group eREG numbers in a resource block RB, and determine, according to the enhanced resource element group numbers, positions of resource elements corresponding to enhanced resource element groups;

a third determining module, configured to obtain a grouping situation of the resource blocks performed by a base station;

a second mapping module, configured to determine, according to grouping of the resource blocks performed by the base station and the positions of the resource elements corresponding to the enhanced resource element groups, positions of resource elements corresponding to an enhanced control channel element in resource block groups; and a second receiving module, configured to receive control information sent by the base station on the positions of the resource elements corresponding to the enhanced control channel element in the resource block groups.

In the method, the apparatus, and the system for transmitting control information provided the embodiments of the present invention, before transmitting the control information, the base station interleaves the eREGs or groups the RBs, so as to configure the eREGs forming the same eCCE to the non-adjacent RBs, thereby alleviating the problem that the channel frequency diversity is poor, lowering the probability of information loss of the terminal device, and improving the performance of the communication system.

BRIEF DESCRIPTION OF DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and a person of ordinary skill in the art may still derive other drawings according to these accompanying drawings without creative efforts.

Figures 2B, 2C:
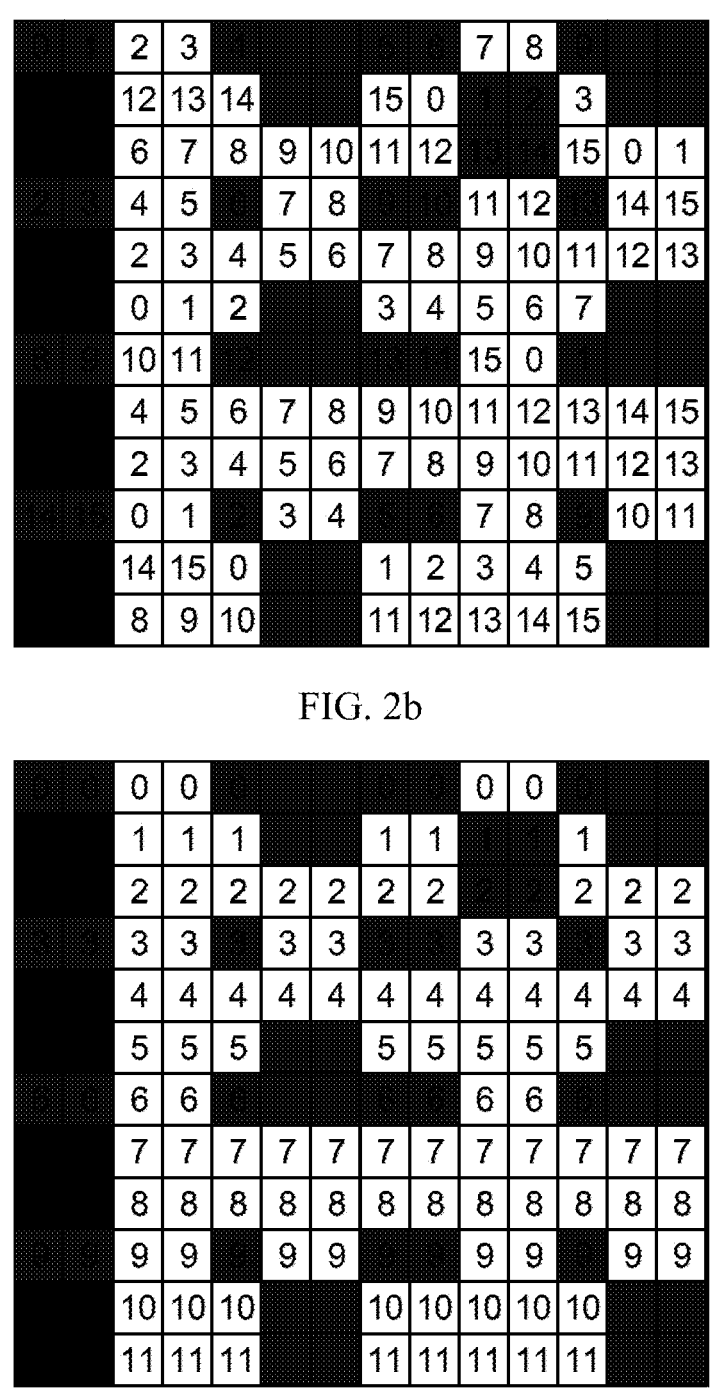

FIG. 2b is a schematic structural diagram of a resource block provided by Embodiment 1 of the present invention;

FIG. 2c is a schematic structural diagram of another resource block provided by Embodiment 1 of the present invention;

FIG. 12a1 is a schematic structural diagram of a base station device provided by Embodiment 11 of the present invention;

FIG. 12a2 is a schematic structural diagram of another base station device provided by Embodiment 11 of the present invention;

FIG. 12a3 is a schematic structural diagram of still another base station device provided by Embodiment 11 of the present invention;

FIG. 12a4 is a schematic structural diagram of still another base station device provided by Embodiment 11 of the present invention;

DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

To make the advantages of the technical solutions of the present invention more comprehensible, the following describes the present invention in detail with reference to the accompanying drawings and the embodiments.

Embodiment 1

Figure 2A:
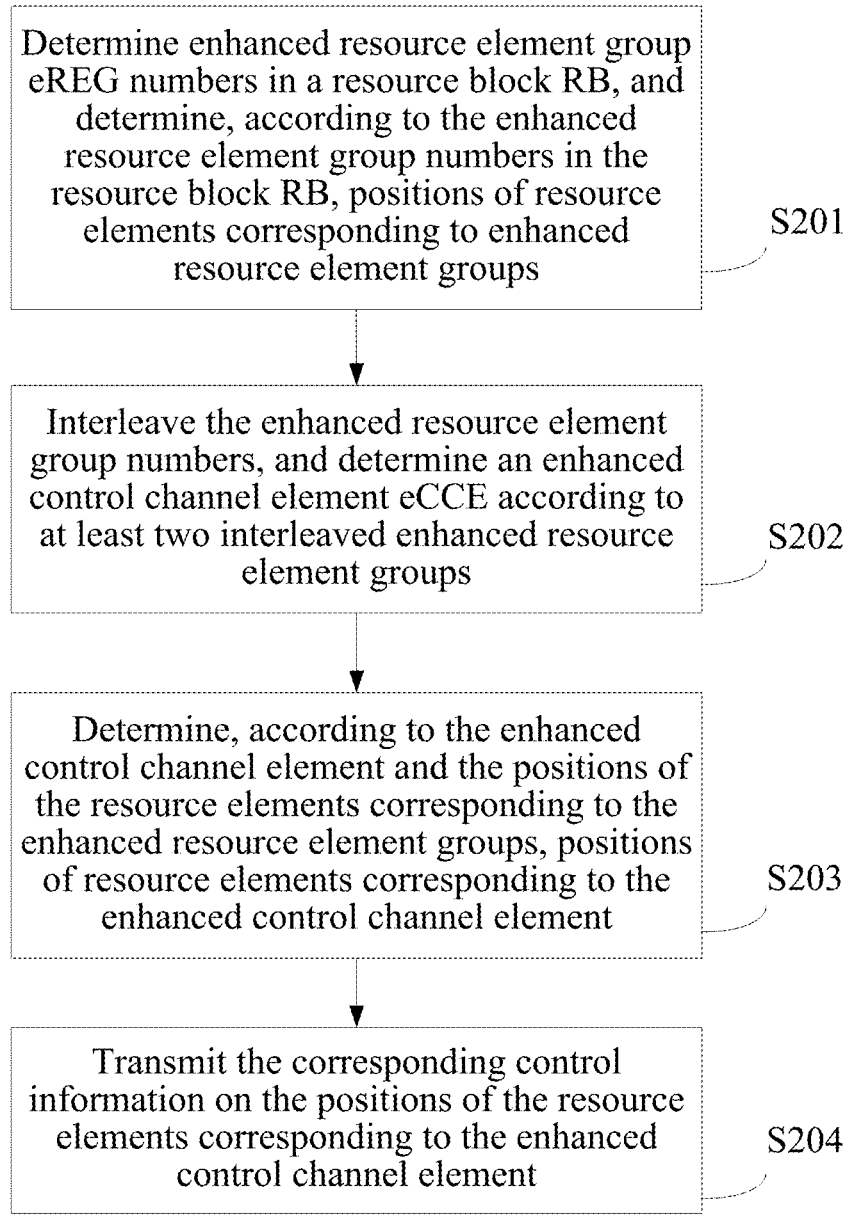
FIG. 2a is a flowchart of a method for transmitting control information provided by Embodiment 1 of the present invention.

An embodiment of the present invention provides a method for transmitting control information, as shown in FIG. 2a, including:

S201: Determine enhanced resource element group eREG numbers in a resource block RB, and determine, according to the enhanced resource element group numbers in the resource block RB, positions of resource elements corresponding to enhanced resource element groups.

The positions of the resource elements corresponding to the enhanced resource element groups in the resource block may have many specific presentation forms, for example:

FIG. 2b shows an example of time priority of the resource elements.

That is, in an RB, a total of 16 REs are defined. According to a principle of time dimension priority, the REs are arranged first according to an OFDM (Orthogonal Frequency Division Multiplexing) symbol sequence, and then according to a sub-carrier sequence, so as to obtain RE0-15, which respectively correspond to the positions of 0-15 after the REs (REs in black and white) mapped by a PDCCH (Physical Downlink Control Channel) and a reference signal are removed in FIG. 2b. Meanwhile, during numbering, a position of a user-level reference signal is already removed. The number of REs respectively corresponding to RE0-15 is 6, 5, 5, 8, 7, 6, 7, 8, 8, 6, 8, 8, 7, 5, 6, and 8.

For another example:

FIG. 2c shows an example of sub-carrier priority of the REs.

That is, in an RB, a total of 12 REs are defined. According to a principle of sub-carrier dimension priority, the REs are arranged first according to a sub-carrier sequence, and then according to an OFDM symbol sequence, so as to obtain RE0-11, which respectively correspond to the positions of 0-11 after the REs (REs in black and gray) mapped by a PDCCH and a reference signal are already removed in FIG. 2c. Meanwhile, during numbering, a position of a user-level reference signal is removed.

It should be noted that the resource block in the embodiment of the present invention includes a virtual resource block or a physical resource block. The resource block includes a resource block in a time slot or a resource block in a subframe, and the resource block in a subframe is also called a resource block pair. The eREG number in the embodiment of the present invention includes a local number of the eREG in an resource block or a uniform number of the eREG in multiple resource blocks; and a form of the eREG number is indicated in a form of an integer or is indicated by using a sub-carrier and an OFDM symbol position of an RE in the eREG.

S202: Interleave the enhanced resource element group numbers, and determine an enhanced control channel element eCCE according to at least two interleaved enhanced resource element groups.

In this embodiment, a base station may interleave the enhanced resource element group numbers. The interleaved enhanced resource element groups are reconfigured in each resource block, and at least two interleaved enhanced resource element groups are made to form the enhanced control channel element, where the enhanced resource element groups forming the enhanced control channel element may be enhanced resource element groups in non-adjacent resource blocks. For example:

Each RB has 8 eREGs, a total of 4 RBs are assigned for ePDCCH distributed transmission, and each two eREGs form an eCCE. eREG numbers in the RB are 0-7, and the RB numbers are 0-3; in the prior art, 0-7 in RB0 are respectively correspondingly combined with 0-7 in RB1, that is, 0 in RB0 is combined with 0 in RB1, and 1 in RB0 is combined with 1 in RB1, so as to obtain eCCE0-7; and 0-7 in RB2 are respectively correspondingly combined with 0-7 in RB3, so as to obtain eCCE8-15.

In this embodiment, the enhanced resource element group numbers in the resource block are interleaved, the eREG number sequence according to the RB sequence is 0-31, the number of columns of the interleaver is twice 8, that is, 16, for example, an inter-column displacement pattern is: <0, 8, 4, 12, 2, 10, 6, 14, 1, 9, 5, 13, 3, 11, 7, 15>, and the number of rows is 2. The eREG numbers are written into the interleaver according to row priority, then inter-column displacement is performed, then reading is performed according to column priority, and the finally obtained eREG number sequence is: 0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, 31; according to a sequence, two eREGs are made to form one eCCE, that is, (0, 16), (8, 24), (4, 20), (12, 28), (2, 18), (10, 26), (6, 22), (14, 30), (1, 17), (9, 25), (5, 21), (13, 29), (3, 19), (11, 27), (7, 23), and (15, 31), that is: eREG0 in RB0 is combined with eREG0 in RB2 to obtain eCCE0; eREG0 in RB1 is combined with eREG0 in RB3 to obtain eCCE1; and so forth, eREG7 in RB1 is combined with eREG7 in RB3 to obtain eCCE15, so as to ensure that the positions of the RBs where the eREGs corresponding to each eCCE are located are non-adjacent.

S203: Determine, according to the enhanced control channel element and the positions of the resource elements corresponding to the enhanced resource element groups, positions of resource elements corresponding to the enhanced control channel element.

In this embodiment, the base station may determine the enhanced control channel element and the positions of the resource elements corresponding to the enhanced resource element groups, and determine the positions of the resource elements corresponding to the enhanced control channel element in the manners of S201-S203 through an existing technical means.

S204: Transmit corresponding control information on the positions of the resource elements corresponding to the enhanced control channel element.

In this embodiment, the base station may transmit the control information after being processed in the manners of S201-S204 to a terminal device, for example, a terminal device and a gateway, in a communication network through an existing technical means.

In the method for transmitting control information provided by this embodiment, before transmitting the control information, the base station interleaves the eREGs, so as to configure the eREGs forming the same eCCE to non-adjacent RBs, thereby alleviating a problem that channel frequency diversity is poor, lowering a probability of information loss of the terminal device, and improving performance of a communication system.

Embodiment 2

Figure 3A:
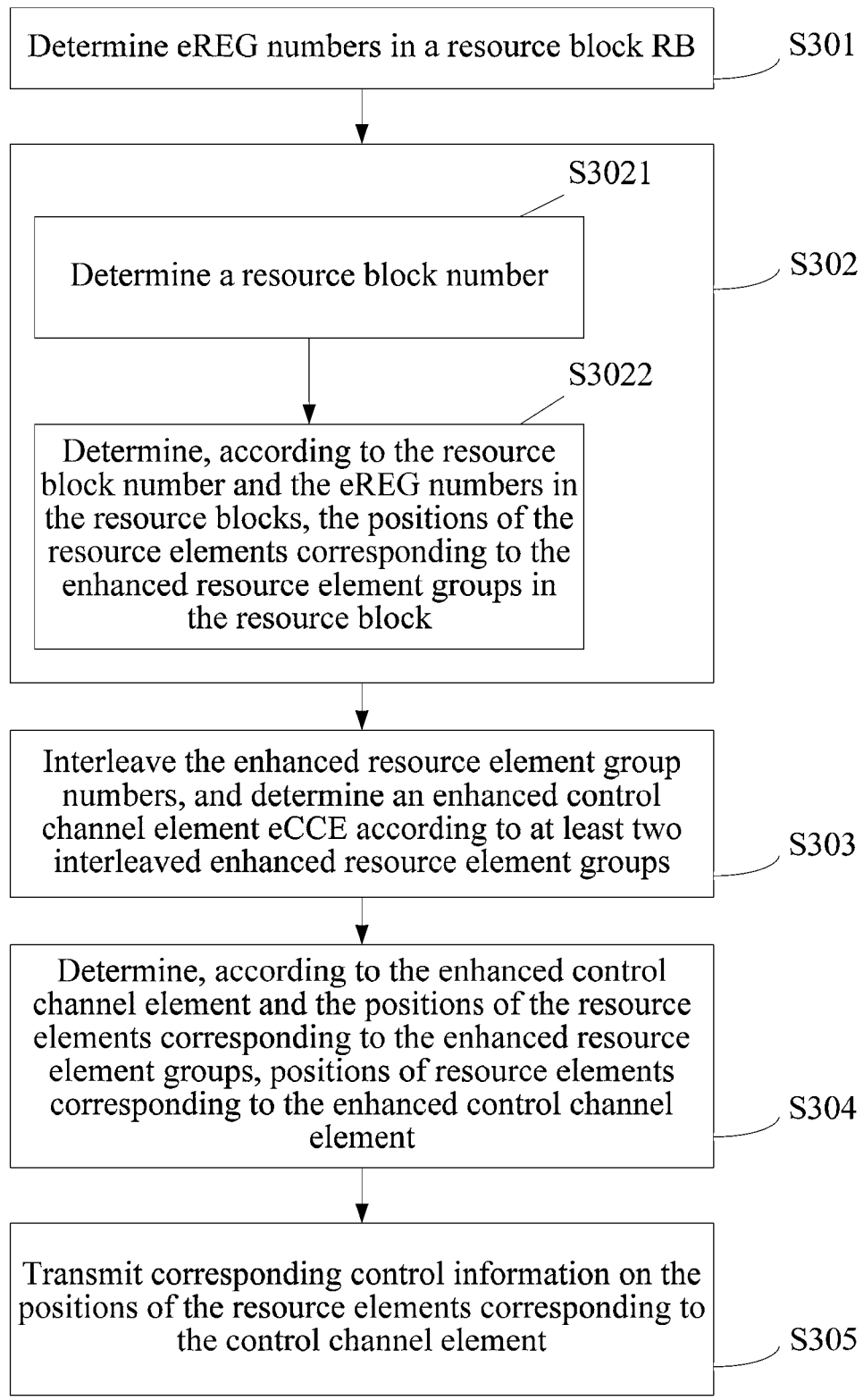
FIG. 3a is a flowchart of a method for transmitting control information provided by Embodiment 2 of the present invention.

An embodiment of the present invention provides a method for transmitting control information, as shown in FIG. 3a, including:

This embodiment mainly provides a specific implementation manner, where a base station reduces a size difference among enhanced control channel elements.

S301: Determine eREG numbers in a resource block RB.

In this embodiment, S301 may include a method procedure from S3011 to S3012.

S3021: Determine a resource block number.

In this embodiment, the base station may obtain each resource block number from a memory through an existing technical means.

It should be noted that the resource block number in the embodiment of the present invention may be a number of the resource block in a system bandwidth, or a number in an ePDCCH (Enhanced Physical Downlink Control Channel, enhanced physical downlink control channel) transmission resource block set, or a number in an ePDCCH distributed transmission resource block set.

S3022: Determine, according to the resource block number and the eREG numbers in the resource blocks, positions of resource elements corresponding to the enhanced resource element groups in the resource block.

Figure 3B:
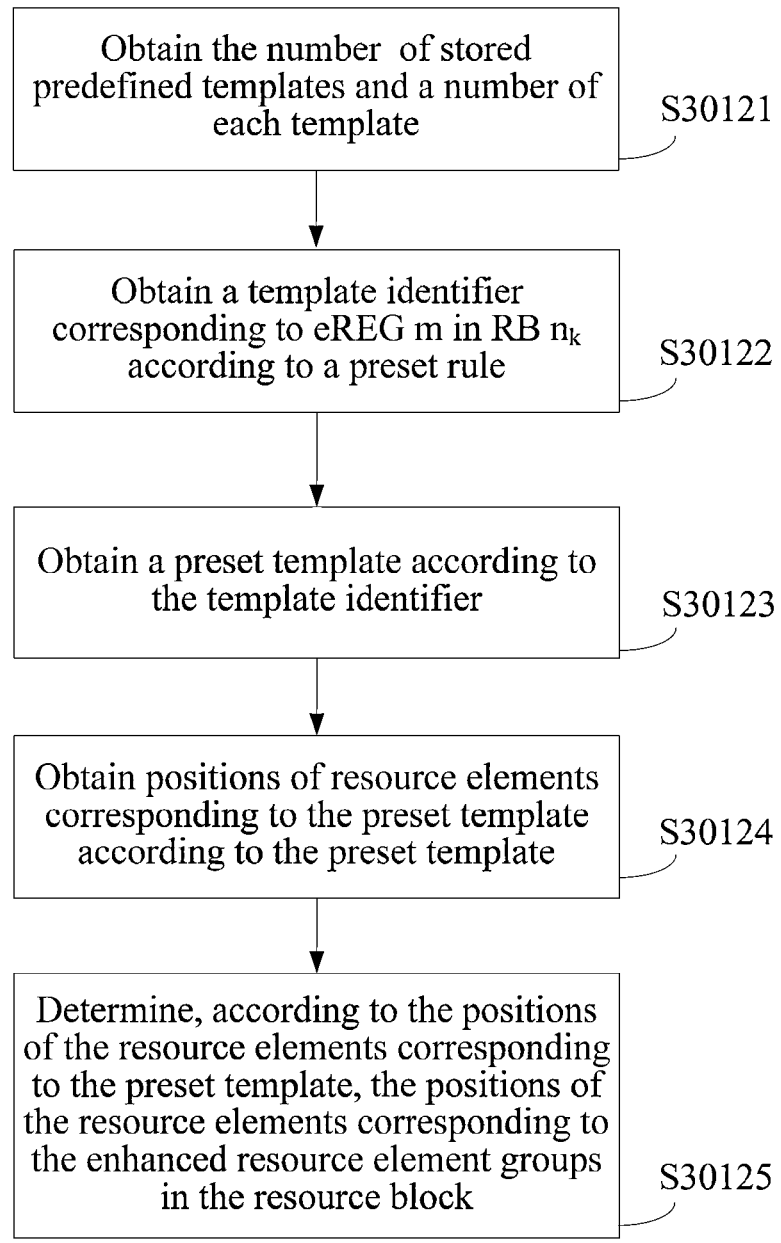
FIG. 3b is a flowchart of another method for transmitting control information provided by Embodiment 2 of the present invention.

Further, in this embodiment, S3022 may have two specific implementation manners, the two implementation manners exist in this embodiment in parallel, and one of the two implementation manners may be executed by the base station according to a specific application scenario, where the two implementation manners include:

Implementation manner 1, as shown in FIG. 3b:

S30121: Obtain the number of stored predefined templates and a number of each template.

In this embodiment, the base station may obtain the number of all the templates stored in the memory and the number of each template.

It should be noted that, the predefined templates stored in the memory may be predefined templates in the existing 3GPP protocol, and the base station may extract at least one from the predefined templates in the memory as a preset template.

S30122: Obtain a template identifier p corresponding to eREG$^m$ in RB$^{n_k}$ according to a preset rule.

The preset rule may be: p=(A·$n_k$+m) mod M

A is a preset positive integer, M is the number of predefined templates, and RB$^{n_k}$ is a resource block numbered $n_k$. eREG$^m$ is an enhanced resource element group numbered m in RB$^{n_k}$.

S30123: Obtain a preset template according to the template identifier.

For example: when the resource block number or the cell identifier is a specified value, for example, 0, the base station may extract a predefined template numbered 0 in the memory from the memory, so as to be used as the preset template in the subsequent step.

S30124: Obtain positions of resource elements corresponding to the preset template according to the preset template.

For example: FIG. 2b shows a predefined template pre-stored in the memory of the base station, and is extracted by the base station as the preset template, the base station may obtain the positions of the resource elements corresponding to the template, for example: in FIG. 2b, the positions of the resource elements corresponding to the template are the white parts.

S30125: Determine, according to the positions of the resource elements corresponding to the preset template, the positions of the resource elements corresponding to the enhanced resource element groups in the resource block.

In this embodiment, the enhanced resource element groups need to occupy the corresponding resource elements in the resource blocks, so that the base station needs to determine the positions of the resource elements corresponding to the enhanced resource element groups in the resource block, for example: in FIG. 2b, eREGs 0-15 respectively occupy the resource elements with the corresponding numbers in FIG. 2b, and the number of the occupied resource elements are respectively: 6, 5, 5, 8, 7, 6, 7, 8, 8, 6, 8, 8, 7, 5, 6, and 8.

Figure 3C:
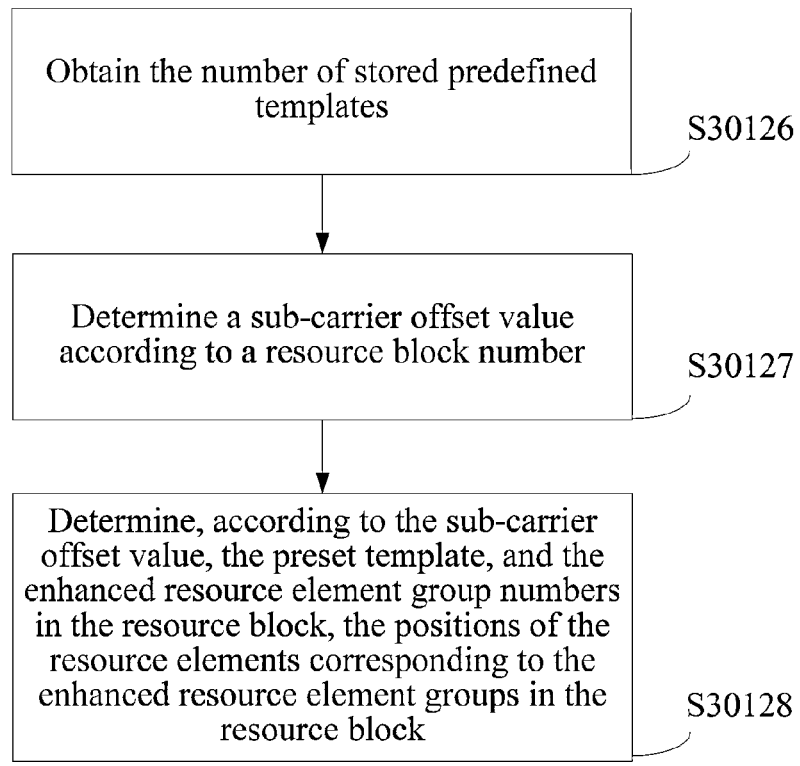
FIG. 3c is a flowchart of still another method for transmitting control information provided by Embodiment 2 of the present invention.

Implementation manner 2, as shown in FIG. 3c:

S30126: Obtain the number of stored predefined templates.

S30127: Determine a sub-carrier offset value according to a resource block number.

In this embodiment, the base station may determine the sub-carrier offset value according to the resource block number, where the sub-carrier offset value may be an integer, for example: $k_{offset}$=$n_k$ mod M, where $k_{offset}$ a sub-carrier offset value, M is the number of predefined templates, and $n_k$ is the resource block number.

S30128: Determine, according to the sub-carrier offset value, a preset template, and the enhanced resource element group numbers in the resource block, the positions of the resource elements corresponding to the enhanced resource element groups in the resource block.

Figure 3D:
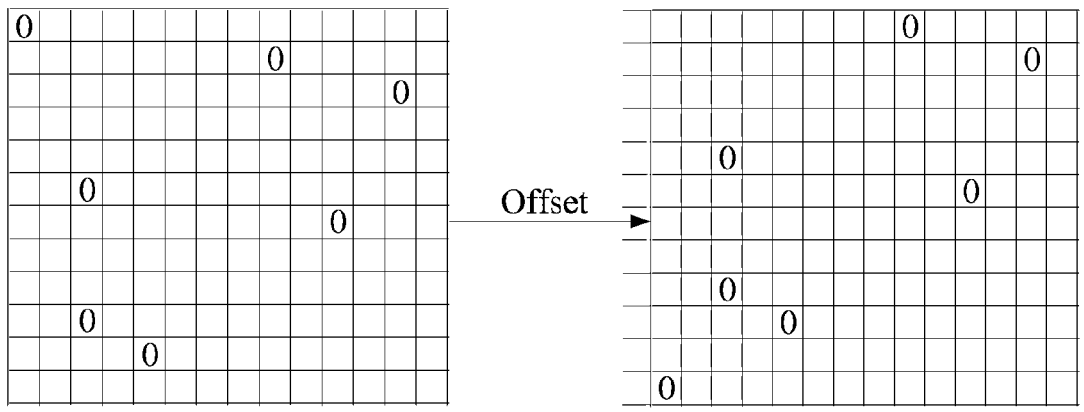
FIG. 3d is a schematic diagram of a structural change of a resource block offset process provided by Embodiment 2 of the present invention.

As shown in FIG. 3d, the left part is the positions of the resource elements corresponding to the resource elements of eREG0 in RB0, and if the sub-carrier offset value obtained by the base station is 1, the positions of the resource elements corresponding to eREG0 in the right RB1 may be obtained. Compared with the left figure, in the right figure, cyclic shift of a sub-carrier is performed on the sub-carrier, that is, all the resource elements occupied by eREG0 are shifted upwards for one grid (the tail of the fixed one is shifted). It should be noted that, the different resource block numbers may correspond to the cyclic shift of the sub-carriers with different sizes, for example, compared with RB0, eREG0 may be shifted upwards for two grids in RB2. According to the foregoing manner, the positions of the resource elements occupied by eREG0 to eREG15 in each resource block are determined.

S303: Interleave the enhanced resource element group numbers, and determine an enhanced control channel element eCCE according to at least two interleaved enhanced resource element groups.

In this embodiment, that the base station maps control information corresponding to the enhanced control channel element to the enhanced resource element groups forming the enhanced control channel element has multiple specific implementation manners, for example:

The base station may first number the eREGs in the RBs according to a sequence of RBs, so as to obtain the eREG numbers in the RB set, which is called a second number of the eREG, and marked as q(0≤q≤N·M−1) q=m·N+$n_k$; and according to the sequence of q, make eREGs with the number of O form one eCCE, and a total of $$V = \left\lfloor \frac{N \cdot M}{O} \right\rfloor$$

eCCEs exist. The number of the eCCE is marked as v(0≤v≤V−1), the second number of the included eREG set is {v·O,v·O+1, . . . (v+1)·O−1} and according to a user ePDCCH aggregation level and the number of the eCCE, the ePDCCH is mapped to the corresponding eCCE for being transmitted, where M is the number of predefined templates, N is the total number of the RBs, RB$^{n_k}$ is a resource block numbered $n_k$. eREG m is an enhanced resource element group numbered m in RB$^{n_k}$.

S304: Determine, according to the enhanced control channel element and the positions of the resource elements corresponding to the enhanced resource element groups, positions of resource elements corresponding to the enhanced control channel element.

S305: Transmit corresponding control information on the positions of the resource elements corresponding to the control channel element.

Figures 1A, 1B:
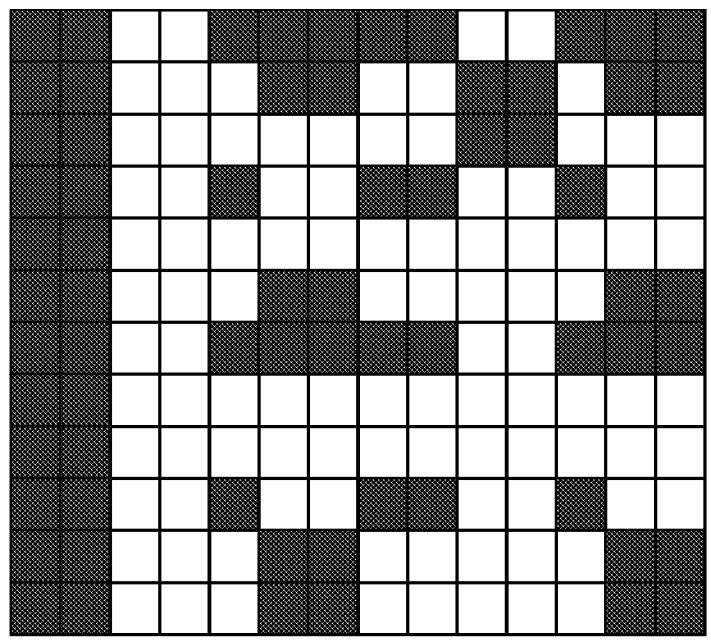
FIG. 1a and FIG. 1b are a schematic structural diagram of a resource block in the prior art.

In order to describe the problem of the prior art solved by this embodiment and the beneficial effect, FIG. 1b is taken as an example for description.

It is assumed that N=4;M=8;O=2; $n_k$=0,1,2,3; V=16;A=1, the number of REs corresponding to the resource blocks and the eREGs is shown in Table 1:

TABLE 1

| Number of Corresponding REs | RB 0 | RB 1 | RB 2 | RB 3 |
|---|---|---|---|---|
| eREG 0 | 16 | 12 | 15 | 14 |
| eREG 1 | 12 | 15 | 14 | 12 |
| eREG 2 | 15 | 14 | 12 | 13 |
| eREG 3 | 14 | 12 | 13 | 12 |
| eREG 4 | 12 | 13 | 12 | 14 |
| eREG 5 | 13 | 12 | 14 | 16 |
| eREG 6 | 12 | 14 | 16 | 12 |
| eREG 7 | 14 | 16 | 12 | 15 |

The number of REs corresponding to each eCCE is shown in Table 2:

TABLE 2

| eCCE | Number of REs | eCCE | Number of REs |
|---|---|---|---|
| 0 | 28 | 1 | 29 |
| 2 | 27 | 3 | 26 |
| 4 | 29 | 5 | 25 |
| 6 | 26 | 7 | 25 |
| 8 | 25 | 9 | 26 |
| 10 | 25 | 11 | 30 |
| 12 | 26 | 13 | 28 |
| 14 | 30 | 15 | 27 |

It may be seen from the foregoing two tables that the number of REs corresponding to the maximal eCCE is 30, and the number of REs corresponding to the minimal eCCE is 25, where the maximal RE difference is 5, and in the prior art, the sizes of the eCCEs are 32, 24, 30, 28, 24, 26, 24, and 28, respectively. The size of the maximal eREG is 32 resource elements, and the size of the minimal eREG is 24 resource elements, where the maximal RE difference is 8.

During practical operation of the communication system, in order to compensate the size difference among different eCCEs, the base station needs to perform relatively complex compensation and control on power assignment according to the size of the eCCE, thereby increasing implementation complexity. For example: when control information with the same size is transmitted on the ePDCCH channel, because of changes of the mapped eCCE, the performance encounters a relatively great change. For example, by adopting QPSK modulation, an encoding rate of 32-bit control information mapped to the eCCE a0 is 0.5; an encoding rate of 32-bit control information mapped to the eCCE a1 is 0.66; and the performance of the control information mapped to the eCCE a1 is relatively poor.

In the method for transmitting control information provided by this embodiment, the size difference among the different enhanced control channel elements is reduced, thereby alleviating a problem that when the base station processes the enhanced control element, the base station performs the relatively complex compensation and control on power assignment to increase the implementation complexity, thereby improving operating efficiency of the base station, so as to improve performance of a communication system.

Embodiment 3

An embodiment of the present invention provides a method for transmitting control information, including:

This embodiment mainly provides another specific implementation manner, where a base station reduces a size difference among enhanced control channel elements.

S401: Determine eREG numbers in a resource block RB.

Figure 4A:
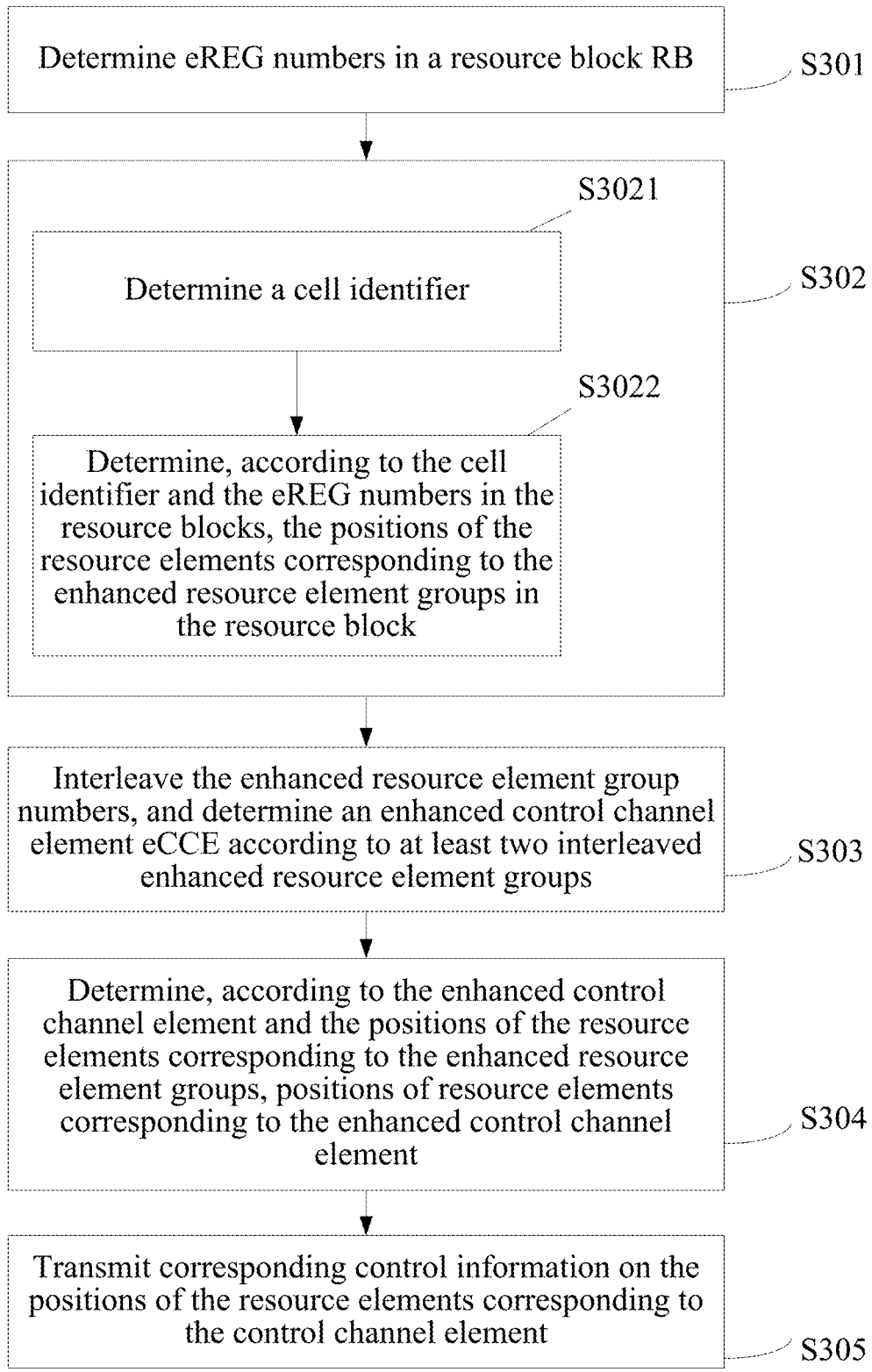
FIG. 4a is a flowchart of a method for transmitting control information provided by Embodiment 3 of the present invention.

In this embodiment, as shown in FIG. 4a, S401 may include a method procedure from S4011 to S4012.

S4021: Determine a cell identifier.

In this embodiment, the base station may obtain the cell identifier through an existing technical means.

S4022: Determine, according to the cell identifier and the eREG numbers in the resource blocks, positions of resource elements corresponding to enhanced resource element groups in the resource blocks.

Figure 4B:
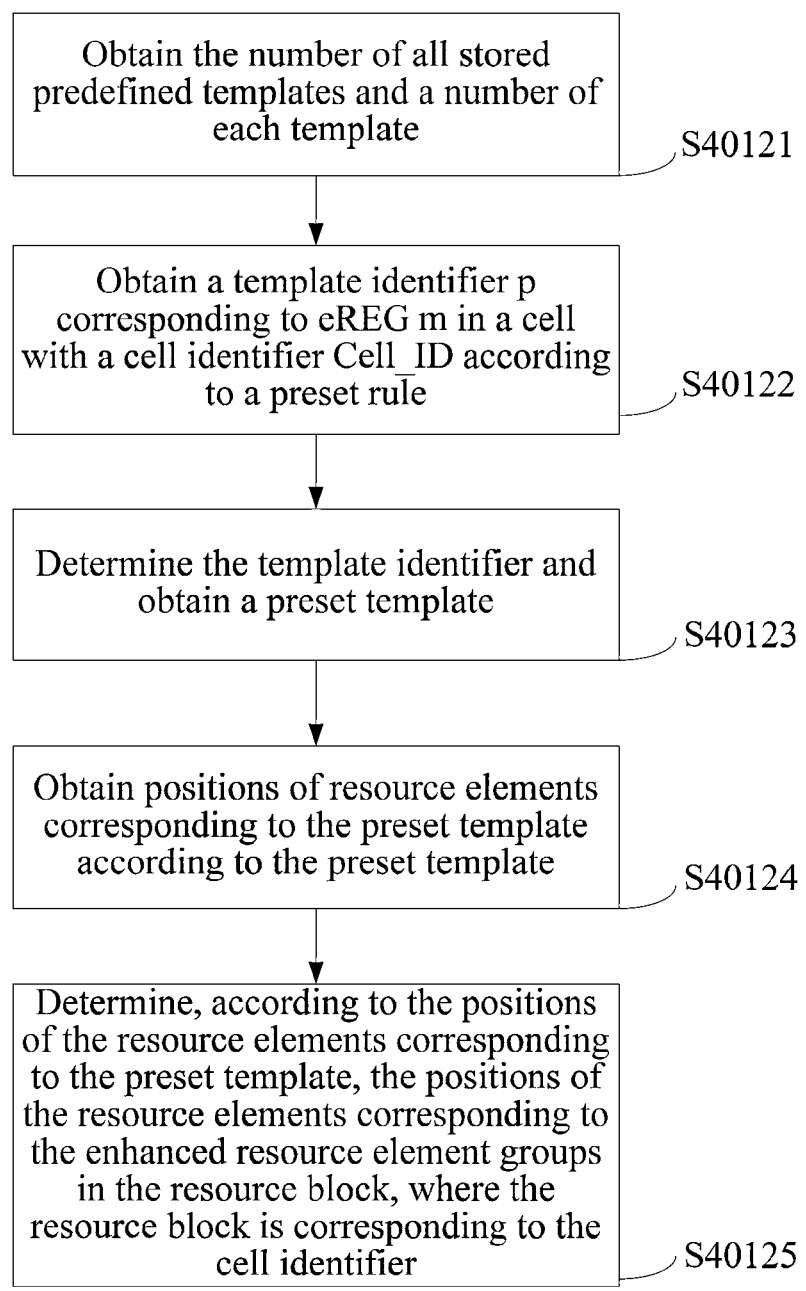
FIG. 4b is a flowchart of another method for transmitting control information provided by Embodiment 3 of the present invention.

Further, in this embodiment, S4012 may have two specific implementation manners, the two implementation manners exist in this embodiment in parallel, and one of the two implementation manners may be executed by the base station according to a specific application scenario, where the two implementation manners include:

Implementation manner 1, as shown in FIG. 4b:

S40121: Obtain the number of all stored predefined templates and a number of each template.

S40122: Obtain a template identifier p corresponding to eREGm in a cell with a cell identifier Cell_ID according to a preset rule.

The preset rule may be: p=(m+Cell_ID)mod M, M is the number of predefined templates, and $RB^{n_k}$ is a resource block numbered $n_k$. eREGm is an enhanced resource element group numbered m in $RBn_k$.

S40123: Determine the template identifier and obtain a preset template.

S40124: Obtain positions of resource elements corresponding to the preset template according to the preset template.

S40125: Determine, according to the positions of the resource elements corresponding to the preset template, the positions of the resource elements corresponding to the enhanced resource element groups in the resource block, where the resource block is corresponding to the cell identifier.

The specific implementation manner of S40122 to S40124 is the same as the specific implementation manner of S30122 to S30124 in Embodiment 2, and details are not repeatedly described herein.

Figure 4C:
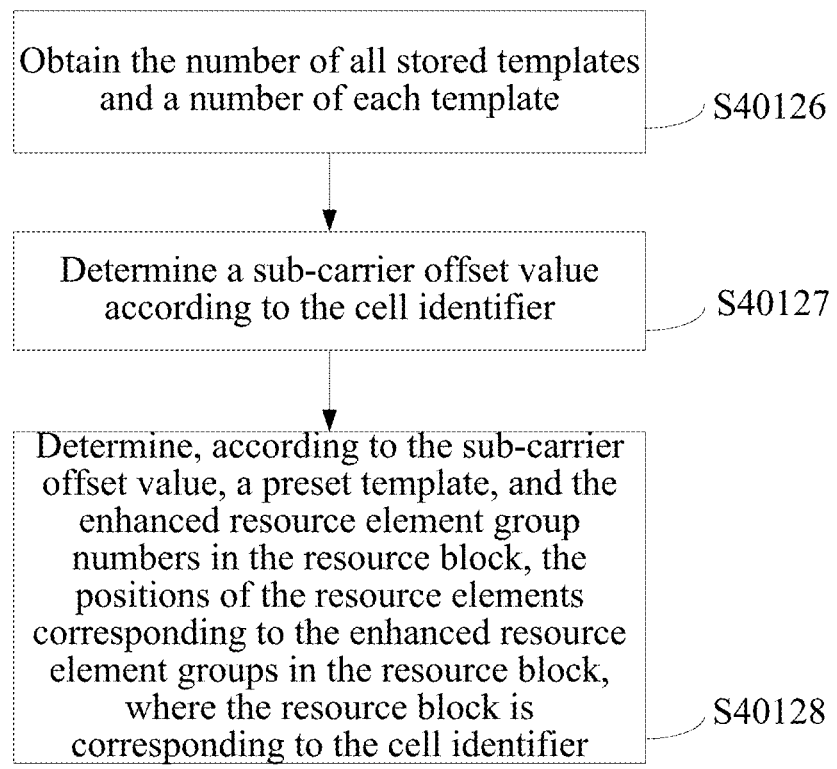
FIG. 4c is a flowchart of still another method for transmitting control information provided by Embodiment 3 of the present invention.

Implementation manner 2, as shown in FIG. 4c:

S40126: Obtain the number of all stored templates and a number of each template.

S40127: Determine a sub-carrier offset value according to the cell identifier.

For example: $k_{offset}=n_{cell}$, mod M, where M is the number of predefined templates, and $n_{cell}$ is a cell identifier.

The cell identifier includes a physical cell identifier or a virtual cell identifier.

S40128: Determine, according to the sub-carrier offset value, a preset template, and the enhanced resource element group numbers in the resource block, the positions of the resource elements corresponding to the enhanced resource element groups in the resource block, where the resource block is corresponding to the cell identifier.

The specific implementation manner of S40128 is the same as the specific implementation manner of S30128 in Embodiment 2, and details are not repeatedly described herein.

S403: Interleave the enhanced resource element group numbers, and determine an enhanced control channel element eCCE according to at least two interleaved enhanced resource element groups.

S404: Determine, according to the enhanced control channel element and the positions of the resource elements corresponding to the enhanced resource element groups, positions of resource elements corresponding to the enhanced control channel element.

S405: Transmit corresponding control information on the positions of the resource elements corresponding to the control channel element.

The specific analysis on the beneficial effect of this embodiment is the same as the analysis on the problem of the prior art solved by Embodiment 2 and the beneficial effect, and therefore details are not repeatedly described herein.

In the method for transmitting control information provided by this embodiment, the size difference among the different enhanced control channel elements is reduced, thereby alleviating a problem that when the base station processes the enhanced control element, the base station performs the relatively complex compensation and control on power assignment to increase the implementation complexity, thereby improving operating efficiency of the base station, so as to improve performance of a communication system.

Embodiment 4

Figure 5:
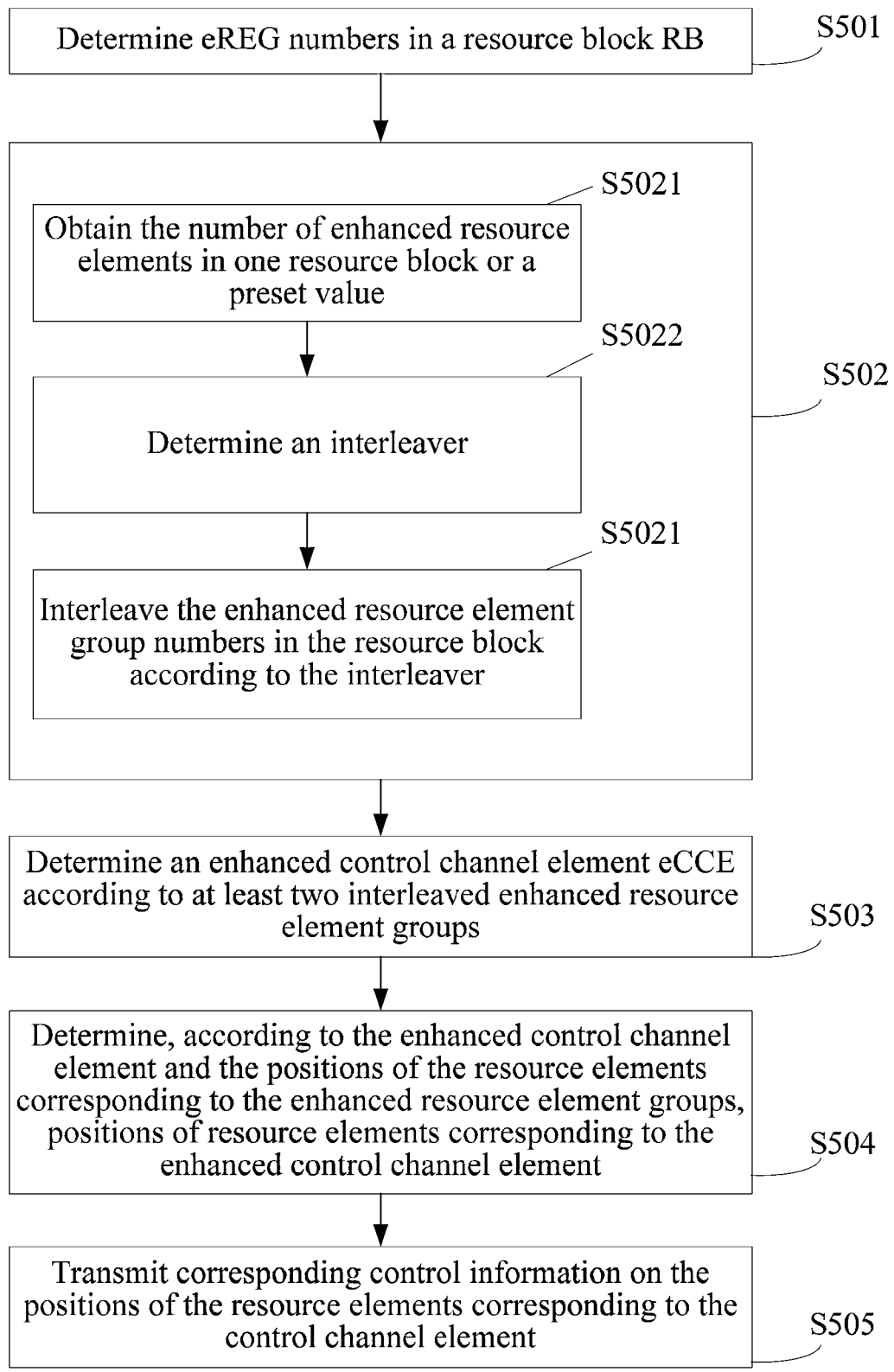
FIG. 5 is a flowchart of still another method for transmitting control information provided by Embodiment 4 of the present invention.

An embodiment of the present invention provides a method for transmitting control information, as shown in FIG. 5, including:

This embodiment mainly provides a specific implementation manner, where a base station interleaves enhanced resource element group numbers.

S501: Determine eREG numbers in a resource block RB.

S502: Interleave the enhanced resource element groups.

In this embodiment, S502 may include a method procedure from S5021 to S5024.

S5021: Obtain the number of enhanced resource elements in one resource block or a preset value.

In this embodiment, the base station obtains the number of enhanced resource elements used for ePDCCH distributed transmission in one resource block, or the number of enhanced resource elements for ePDCCH distributed transmission and the number of virtual enhanced resource elements in one resource block. For example:

The number of the enhanced resource elements used for ePDCCH distributed transmission in one resource block is 16, the number of virtual enhanced resource elements is 1, and the total number is 17. The former is used for the ePDCCH distributed transmission, and the latter is filled in behind the former, but not used for the ePDCCH distributed transmission, and only occupies the interleaved position during interleaving to change an interleaving effect, and the latter is deleted after the interleaving.

Alternatively, the obtained preset value is one of 4, 8, 12, 16, and 32.

S5022: Determine an interleaver.

The number of rows or columns of the interleaver is the number of enhanced resource element groups in one resource block or a multiple of the number; or the number of rows or columns of the interleaver is one of preset 4, 8, 12, 16, and 32.

In this embodiment, the interleaver determined by the base station may include the following characteristics:

That is, an inter-row or inter-column displacement pattern is <0, 2, 1, 3> or <0, 4, 2, 6, 1, 5, 3, 7> or <0, 8, 4, 2, 10, 6, 1, 9, 5, 3, 11, 7> or <0, 8, 4, 12, 2, 10, 6, 14, 1, 9, 5, 13, 3, 11, 7, 15> or <1, 17, 9, 25, 5, 21, 13, 29, 3, 19, 11, 27, 7, 23, 15, 31, 0, 16, 8, 24, 4, 20, 12, 28, 2, 18, 10, 26, 6, 22, 14, 30>.

S5023: Interleave the enhanced resource element group numbers in the resource block according to the interleaver.

In this embodiment, the base station interleaves the enhanced resource element group numbers in the resource block according to the interleaver.

S503: Determine an enhanced control channel element eCCE according to at least two interleaved enhanced resource element groups.

It should be noted that, before the interleaving, the enhanced resource element groups are distributed in each resource block according to a certain sequence. In this embodiment, the base station may redistribute, according to the sequence of the interleaved enhanced resource element groups, the enhanced resource element groups in the resource blocks, so as to obtain, according to the sequence after the interleaving, grouping of the enhanced resource element groups, where one grouping is one enhanced control channel element eCCE. Therefore, the enhanced resource element groups forming the enhanced control channel element are displaced to non-adjacent resource blocks.

S504: Determine, according to the enhanced control channel element and the positions of the resource elements corresponding to the enhanced resource element groups, positions of resource elements corresponding to the enhanced control channel element.

S504: Transmit corresponding control information on the positions of the resource elements corresponding to the control channel element.

In the method for transmitting control information provided by the present invention, before transmitting the control information, the base station interleaves the eREGs, so as to configure the eREGs forming the same eCCE to non-adjacent RBs, thereby alleviating a problem that channel frequency diversity is poor, lowering a probability of information loss of a terminal device, and improving performance of a communication system.

Embodiment 5

Figure 6:
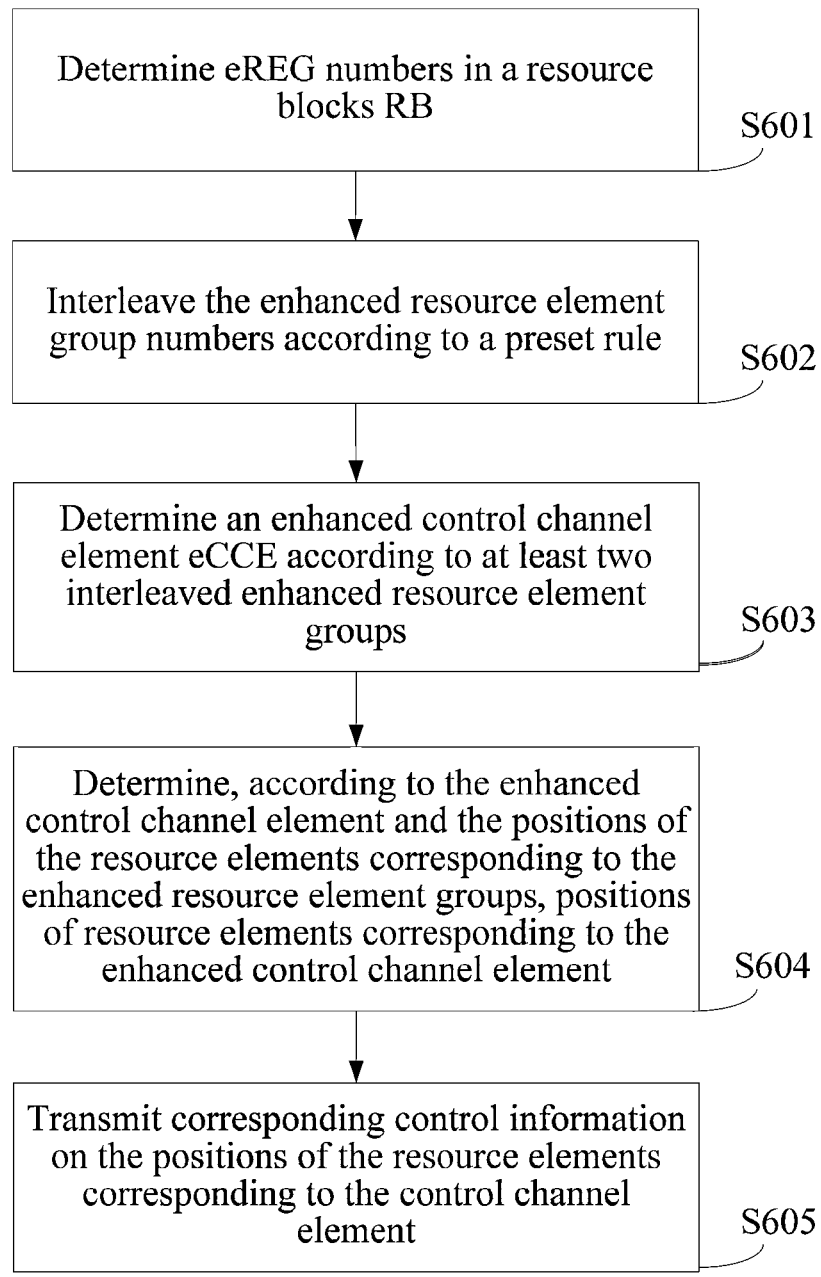
FIG. 6 is a flowchart of a method for transmitting control information provided by Embodiment 5 of the present invention.

An embodiment of the present invention provides a method for transmitting control information, as shown in FIG. 6, including:

This embodiment mainly provides another specific implementation manner, where a base station interleaves enhanced resource element group numbers.

S601: Determine eREG numbers in a resource block RB.

S602: Interleave the enhanced resource element group numbers according to a preset rule.

In this embodiment, S602 may include a method procedure from S6021 to S6023.

S6021: Obtain enhanced resource element numbers, the number of enhanced resource elements in one resource block, and a resource block number of enhanced resource elements forming one control channel element.

S6022: Re-number, according to a preset rule, enhanced resource elements in the enhanced resource elements forming the same control channel element.

The preset rule includes: $n_{2,eREG} = n_{1,eREG} \cdot M + n_{RB}$, where $n_{1,eREG}$ is a number of an enhanced resource element in a resource block, $n_{RB}$ is the resource block number, $n_{2eREG}$ is a new number of the enhanced resource element, M is the number of enhanced resource elements in one resource block.

S603: Determine an enhanced control channel element eCCE according to at least two interleaved enhanced resource element groups.

Before the interleaving, the enhanced resource element groups are distributed in each resource block according to a certain sequence. In this embodiment, the base station may redistribute, according to the sequence of the interleaved enhanced resource element groups, the enhanced resource element groups in the resource blocks, so as to obtain grouping of the enhanced resource element groups, where each group is one enhanced control channel element eCCE. Therefore, the enhanced resource element groups forming the enhanced control channel element are displaced to non-adjacent resource blocks.

S604: Determine, according to the enhanced control channel element and the positions of the resource elements corresponding to the enhanced resource element groups, positions of resource elements corresponding to the enhanced control channel element.

S605: Transmit corresponding control information on the positions of the resource elements corresponding to the control channel element.

In the method for transmitting control information provided by the present invention, before transmitting the control information, the base station interleaves the eREGs, so as to configure the eREGs forming the same eCCE to non-adjacent RBs, thereby alleviating a problem that channel frequency diversity is poor, lowering a probability of information loss of a terminal device, and improving performance of a communication system.

Embodiment 6

Figure 7:
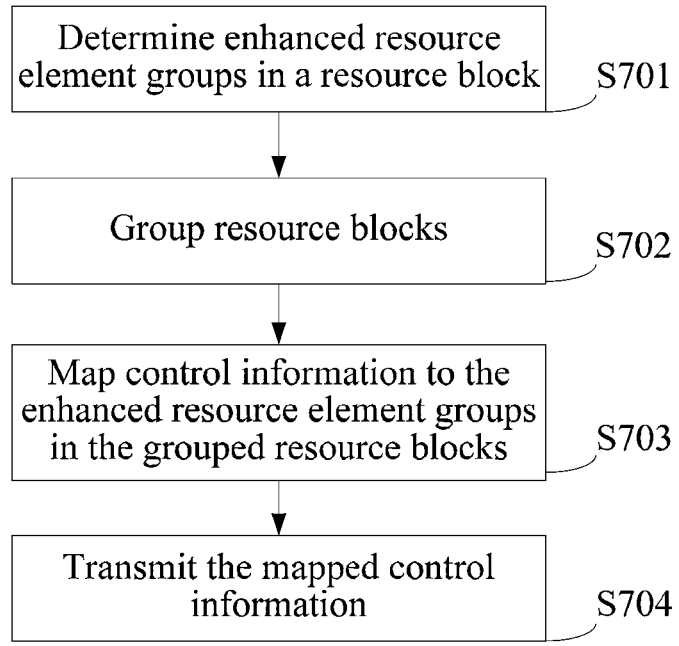
FIG. 7 is a flowchart of a method for transmitting control information provided by Embodiment 6 of the present invention.

An embodiment of the present invention provides a method for transmitting control information, as shown in FIG. 7, including:

S701: Determine enhanced resource element groups eREGs in a resource block RB.

S702: Group resource blocks.

In this embodiment, a base station may directly group resource blocks, so that the resource blocks where the enhanced resource elements forming an enhanced control channel element are located are non-adjacent. For example: eREG0s forming the eCCE0 are respectively in RB0, RB1, and RB2, and an original arrangement sequence of the RBs in the system is: RB0-RB1-RB2-RB3-RB4-RB5, and the base station may regroup RB0, RB1, and RB2 to change the arrangement sequence of the RBs to RB0-RB3-RB1-RB4-RB2-RB5, so as to implement that RB0, RB1, and RB2 are non-adjacent.

S703: Map control information to the enhanced resource element groups in the grouped resource blocks.

In S703, an optional specific implementation manner includes:

determining that a number of an enhanced control channel element in a resource block numbered $n_{RB}$ corresponding to in an enhanced resource element group numbered $k_{eCCE}$ is $m_{eREG}$, where $m_{eREG}$ includes:

$$m_{eREG}=(k_{eCCE}+n_{RB})\bmod M; \text{ or}$$

$$m_{eREG}=(k_{eCCE}+n_{RB}+O_{offset})\bmod M; \text{ or}$$

$$m_{eREG}=(Q\cdot k_{eCCE}+n_{RB}\cdot P_{offset})\bmod M; \text{ or}$$

$$m_{eREG}=(k_{eCCE}+n_{RB}\cdot P_{offset}+O_{offset})\bmod M;$$

where M is a value determined according to the number of enhanced resource element groups in the resource blocks, $P_{offset}$ is a second offset value of the enhanced resource element group in the resource block, $O_{offset}$ is a first offset value of the enhanced resource element group in the resource block, Q is a weighting factor of the enhanced control channel element, and $P_{offset}$, or $O_{offset}$ or Q is a predefined positive integer value or a positive integer value configured by high layer control signaling.

For example, $k_{eCCE}$ is 0-15, $n_{RB}$ is 0-3, $m_{eREG}$ is 0-15, M is 16, Q is 1, and $P_{offset}$ is 1. $m_{eREG}=(Q\cdot k_{eCCE}+n_{RB}\cdot P_{offset})\bmod M$ is equivalent to $m_{eREG}=(k_{eCCE}+n_{RB})\bmod M$. According to $m_{eREG}=(Q\cdot k_{eCCE}+n_{RB}\cdot P_{offset})\bmod M$, eREGs in the grouped resource blocks corresponding to the eCCEs in Table 6 in the following may be obtained.

TABLE 6

|  | RB 0 | RB 1 | RB 2 | RB 3 |
| --- | --- | --- | --- | --- |
| eCCE 0 | eREG 0 | eREG 1 | eREG 2 | eREG 3 |
| eCCE 1 | eREG 1 | eREG 2 | eREG 3 | eREG 4 |
| eCCE 2 | eREG 2 | eREG 3 | eREG 4 | eREG 5 |
| eCCE 3 | eREG 3 | eREG 4 | eREG 5 | eREG 6 |
| eCCE 4 | eREG 4 | eREG 5 | eREG 6 | eREG 7 |
| eCCE 5 | eREG 5 | eREG 6 | eREG 7 | eREG 8 |
| eCCE 6 | eREG 6 | eREG 7 | eREG 8 | eREG 9 |
| eCCE 7 | eREG 7 | eREG 8 | eREG 9 | eREG 10 |
| eCCE 8 | eREG 8 | eREG 9 | eREG 10 | eREG 11 |
| eCCE 9 | eREG 9 | eREG 10 | eREG 11 | eREG 12 |
| eCCE 10 | eREG 10 | eREG 11 | eREG 12 | eREG 13 |
| eCCE 11 | eREG 11 | eREG 12 | eREG 13 | eREG 14 |
| eCCE 12 | eREG 12 | eREG 13 | eREG 14 | eREG 15 |
| eCCE 13 | eREG 13 | eREG 14 | eREG 15 | eREG 0 |
| eCCE 14 | eREG 14 | eREG 15 | eREG 0 | eREG 1 |
| eCCE 15 | eREG 15 | eREG 0 | eREG 1 | eREG 2 |

For example, $k_{eCCE}$ is 0-7, $n_{RB}$ is 0-3, $m_{eREG}$ is 0-15, M is 16, $O_{offset}$ is 0 or 8; the eCCE includes eight eREGs, that is, each resource block has two eREGs corresponding to the eCCE, and according to $m_{eREG}=(k_{eCCE}+n_{RB}+O_{offset})\bmod M$, eREGs in the grouped resource blocks corresponding to the eCCEs in Table 7 in the following may be obtained.

TABLE 7

|  | $O_{offset}=0$ | | | | $O_{offset}=8$ | | | |
| --- | --- | --- | --- | --- | --- | --- | --- | --- |
|  | RB 0 | RB 1 | RB 2 | RB 3 | RB 0 | RB 1 | RB 2 | RB 3 |
| eCCE 0 | eREG 0 | eREG 1 | eREG 2 | eREG 3 | eREG 8 | eREG 9 | eREG 10 | eREG 11 |
| eCCE 1 | eREG 1 | eREG 2 | eREG 3 | eREG 4 | eREG 9 | eREG 10 | eREG 11 | eREG 12 |
| eCCE 2 | eREG 2 | eREG 3 | eREG 4 | eREG 5 | eREG 10 | eREG 11 | eREG 12 | eREG 13 |
| eCCE 3 | eREG 3 | eREG 4 | eREG 5 | eREG 6 | eREG 11 | eREG 12 | eREG 13 | eREG 14 |

TABLE 7-continued

| | $O_{offset} = 0$ | | | | $O_{offset} = 8$ | | | |
|---|---|---|---|---|---|---|---|---|
| | RB 0 | RB 1 | RB 2 | RB 3 | RB 0 | RB 1 | RB 2 | RB 3 |
| eCCE 4 | eREG 4 | eREG 5 | eREG 6 | eREG 7 | eREG 12 | eREG 13 | eREG 14 | eREG 15 |
| eCCE 5 | eREG 5 | eREG 6 | eREG 7 | eREG 8 | eREG 13 | eREG 14 | eREG 15 | eREG 0 |
| eCCE 6 | eREG 6 | eREG 7 | eREG 8 | eREG 9 | eREG 14 | eREG 15 | eREG 0 | eREG 1 |
| eCCE 7 | eREG 7 | eREG 8 | eREG 9 | eREG 10 | eREG 15 | eREG 0 | eREG 1 | eREG 2 |

In the foregoing manner, a result obtained according to another formula and parameter value may be obtained, and details are not repeatedly described. In this embodiment, that the eREGs corresponding to the eCCE in the grouped resource blocks are represented in a form of formula is equivalent to that the eREGs corresponding to the eCCE in the grouped resource blocks are represented in a form of table.

By using the foregoing method, the enhanced resource element group numbers corresponding to one or more enhanced control channel elements with different numbers in the grouped resource blocks are determined, and the control information is mapped to the enhanced resource element groups in the grouped resource blocks corresponding to one or more enhanced control channel elements.

S704: Transmit the mapped control information.

In the method for transmitting control information provided by the present invention, before transmitting the control information, the base station interleaves the eREGs, so as to configure the eREGs forming the same eCCE to non-adjacent RBs, thereby alleviating a problem that channel frequency diversity is poor, lowering a probability of information loss of a terminal device, and improving performance of a communication system.

Embodiment 7

Figure 8A:
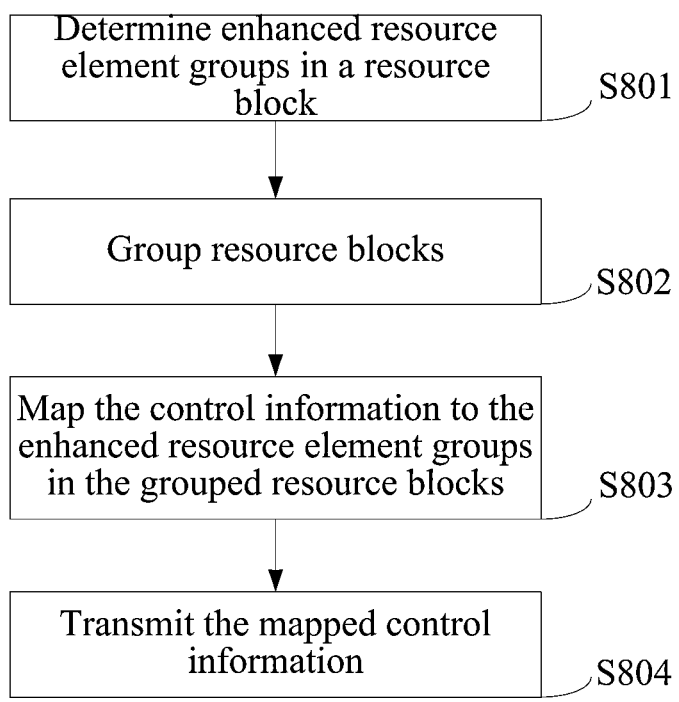
FIG. 8a is a flowchart of a method for transmitting control information provided by Embodiment 7 of the present invention.

An embodiment of the present invention provides a method for transmitting control information, as shown in FIG. 8a, including:

This embodiment mainly provides a specific implementation manner, where a base station groups resource blocks.

S801: Determine enhanced resource element groups eREGs in a resource block RB.

S802: Group resource blocks.

For example:

Table 3 shows an example of assignment of virtual resource blocks of distributed type (Virtual resource blocks of distributed type, DVRB). DVRB 0 is formed by a PRB0 (Physical Resource Block, physical layer resource block) of an even time slot and a PRB18 of an odd time slot. In this manner, DVRB0 may achieve a relatively good frequency diversity effect. DVRB2 is formed by the PRB18 of the even time slot and the PRB0 of the odd time slot. In this way, it may be seen that the DVRB0 and DVRB2 are a group of paired DVRBs, and occupy PRB0 and PRB18 of a subframe.

TABLE 3

| PRB number | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|---|
| Even time slot DVRB number | 0 | 4 | 8 | 12 | 16 | 18 | 1 | 5 | 9 | 13 | | | | Not used by the DVRB | | | | | 2 | 6 | 10 | 14 | 17 | 19 | 3 | 7 | 11 | 15 |
| Odd time slot DVRB number | 2 | 6 | 10 | 14 | 17 | 19 | 3 | 7 | 11 | 15 | | | | | | | | | 0 | 4 | 8 | 12 | 16 | 18 | 1 | 5 | 9 | 13 |

In this embodiment, S802 may have two specific implementation methods.

Figure 8B:
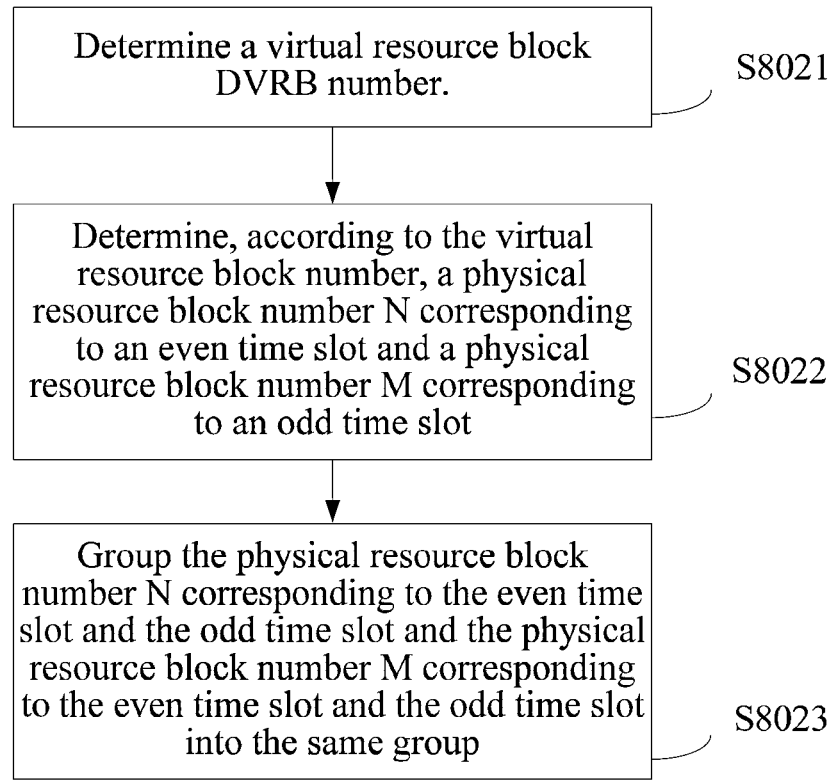
FIG. 8b is a flowchart of another method for transmitting control information provided by Embodiment 7 of the present invention.

Implementation method 1: As shown in FIG. 8b, S802 may include a method procedure from S8021 to S8023.

S8021: Determine a virtual resource block DVRB number.

S8022: Determine, according to the virtual resource block number, a physical resource block number N corresponding to an even time slot and a physical resource block number M corresponding to an odd time slot.

S8023: Group the physical resource block number N corresponding to the even time slot and the odd time slot and the physical resource block number M corresponding to the even time slot and the odd time slot into the same group.

For example:

The base station may assign a DVRB set for ePDCCH distributed transmission. The DVRB set at least includes two DVRBs, the DVRBs are used to support the ePDCCH distributed transmission, or the ePDCCH distributed transmission and ePDCCH centralized transmission.

It is assumed that the DVRB set supporting the ePDCCH distributed transmission includes N DVRBs, where N is an even number.

One DVRB includes M eREGs, the number is $m(0 \leq m \leq M-1)$, and at least two eREGs are in different DVRBs.

The resource is assigned for the ePDCCH distributed transmission in the DVRB manner, the DVRB number of the even time slot is also used in the odd time slot, that is, the assigned DVRB number is corresponding to one PRB number in one subframe, one eCCE at least includes at least two eREGs in a group of paired DVRBs, and the two eREGs are respectively in the corresponding DVRBs. As shown in Table 4, one eCCE at least respectively includes at least one eREG in DVRBs 0 and 2, or one eCCE at least respectively includes at least one eREG in DVRBs 1 and 3. For example:

The numbers of the DVRBs to which the eREG0s included in the eCCE 0 belongs are: DVRB 0 and DVRB 2, that is to say, the numbers of the PRBs where the eREG0s forming the eCCE 0 are located are 0 and 18. PRB 0 and PRB 18 are non-adjacent and spaced by 17 PRBs. Similarly, the base station may group the PRBs in the same manner, so that the PRBs in each group are non-adjacent, and are spaced by 17. Therefore, the resource blocks where the enhanced resource elements forming the enhanced control channel element are located are non-adjacent, so that the enhanced resource elements forming the enhanced control channel element has a relatively large frequency diversity.

TABLE 4

| PRB number | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|---|
| DVRB number | 0 | 4 | 8 | 12 | 16 | 18 | 1 | 5 | 9 | 13 | Not used by the DVRB | | | | | | | | 2 | 6 | 10 | 14 | 17 | 19 | 3 | 7 | 11 | 15 |

Figure 8C:
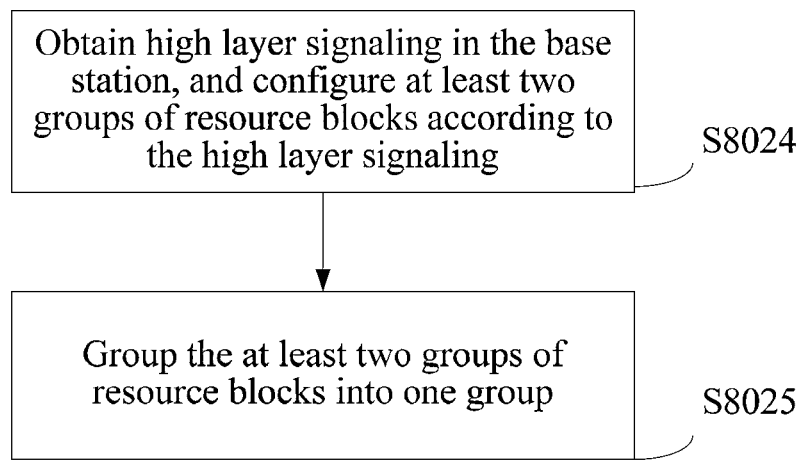
FIG. 8c is a flowchart of another method for transmitting control information provided by Embodiment 7 of the present invention.

Implementation method 2: As shown in FIG. 8c, S802 may include a method procedure from S8024 to S8025.

S8024: Obtain high layer signaling in the base station, and configure at least two groups of resource blocks according to the high layer signaling.

In this embodiment, the base station may obtain the high layer signaling, and configure at least two groups of non-adjacent resource blocks according to the high layer signaling, so the resource blocks where the enhanced resource elements forming the enhanced control channel element are located are non-adjacent, so that the enhanced resource elements forming the enhanced control channel element has a relatively large frequency diversity.

For example, resource configuration is performed through an ePDCCH distributed transmission resource configuration field in radio resource control connection reconfiguration RRCConnectionReconfiguration signaling, in the example shown in Table 5, four groups of resource blocks are configured, and each resource block respectively corresponds to two non-adjacent physical resource blocks.

TABLE 5

| | First physical resource block number | Second physical resource block number |
|---|---|---|
| First group of resource blocks | 0 | 50 |
| Second group of resource blocks | 10 | 60 |
| Third group of resource blocks | 20 | 70 |
| Fourth group of resource blocks | 30 | 80 |

S8025: Group the at least two groups of resource blocks into one group.

S803: Map control information to the enhanced resource element groups in the grouped resource blocks.

S804: Transmit the mapped control information.

In the method for transmitting control information provided by the present invention, before transmitting the control information, the base station groups the RBs, so as to configure the eREGs forming the same eCCE to non-adjacent RBs, thereby alleviating a problem that channel frequency diversity is poor, lowering a probability of information loss of a terminal device, and improving performance of a communication system.

Embodiment 8

Figure 9:
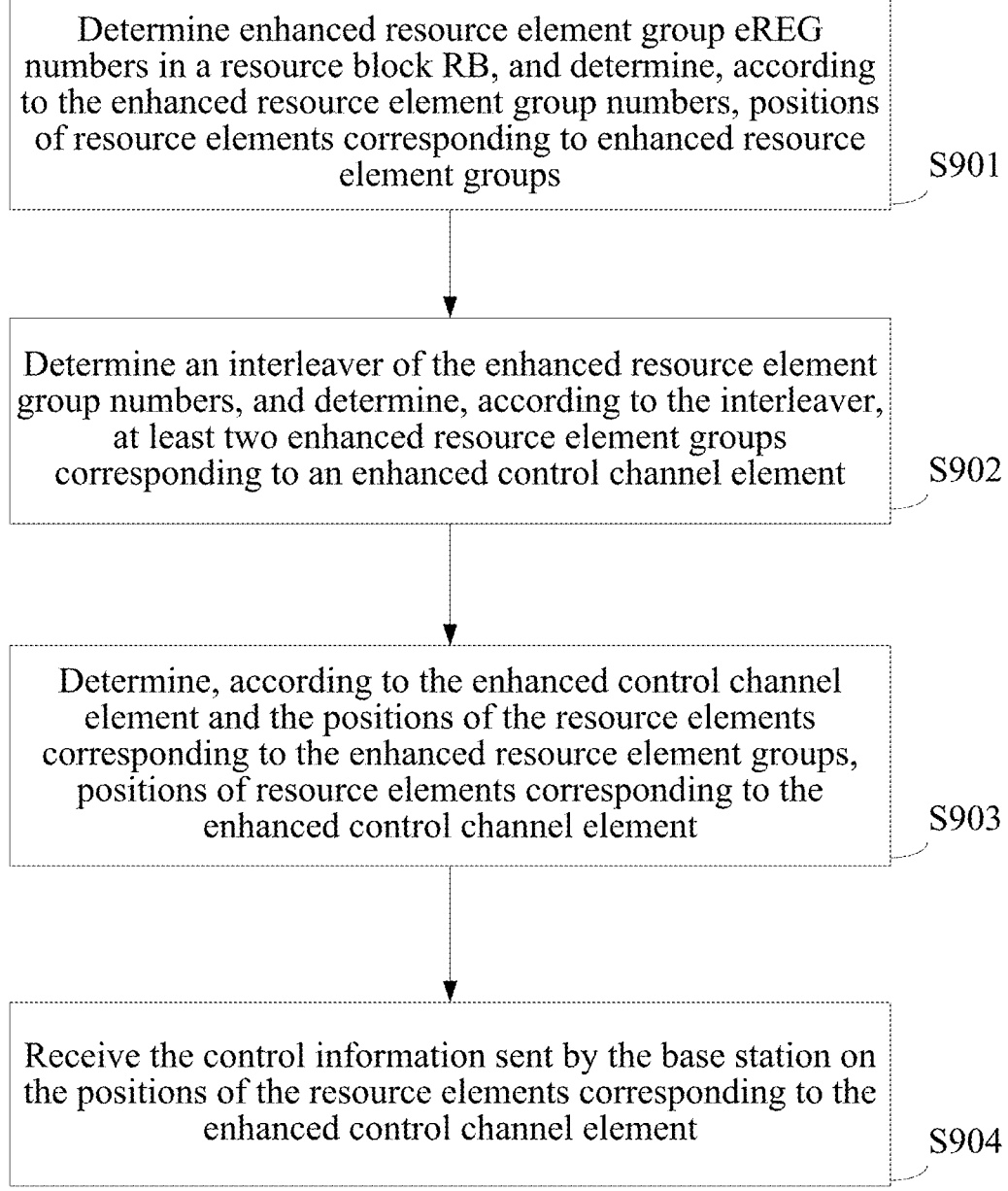
FIG. 9 is a flowchart of a method for transmitting control information provided by Embodiment 8 of the present invention.

An embodiment of the present invention provides a method for transmitting control information, as shown in FIG. 9, including:

This embodiment mainly provides a specific implementation manner, where a terminal device groups resource blocks.

S901: Determine enhanced resource element group eREG numbers in a resource block RB, and determine, according to the enhanced resource element group numbers, positions of resource elements corresponding to enhanced resource element groups.

It should be noted that, for the specific processing manner that the terminal device UE determines the enhanced resource element group eREG number in the resource block RB, and determines, according to the enhanced resource element group numbers, the positions of the resource elements corresponding to the enhanced resource element groups, reference may be made to the specific implementation manner described in the foregoing embodiments, and details are not repeatedly described herein.

S902: Determine an interleaver of the enhanced resource element group numbers, and determine, according to the interleaver, at least two enhanced resource element groups corresponding to an enhanced control channel element.

In this embodiment, for the specific processing manner that the terminal device determines the interleaver, reference may be made to the specific implementation manner described in the foregoing embodiments, and details are not repeatedly described herein.

S903: Determine, according to the enhanced control channel element and the positions of the resource elements corresponding to the enhanced resource element groups, positions of resource elements corresponding to the enhanced control channel element.

The manner that terminal device determines, according to the interleaver, at least two enhanced resource element groups forming the enhanced control channel element, then determines, according to the enhanced control channel element and the positions of the resource elements corresponding to the enhanced resource element groups, the positions of the resource elements corresponding to the enhanced control channel element has a plurality of types, and for the specific processing manner, reference may be made to the specific implementation manner described in the foregoing embodiments, and details are not repeatedly described herein.

S904: Receive the control information sent by the base station on the positions of the resource elements corresponding to the enhanced control channel element.

In the method for transmitting control information provided by the present invention, the eREGs forming the same eCCE are configured to non-adjacent RBs, thereby when the terminal device processes the control information sent by the base station, alleviating a problem that channel frequency diversity is poor, lowering a probability of information loss of a terminal device, and improving performance of a communication system.

Embodiment 9

Figure 10:
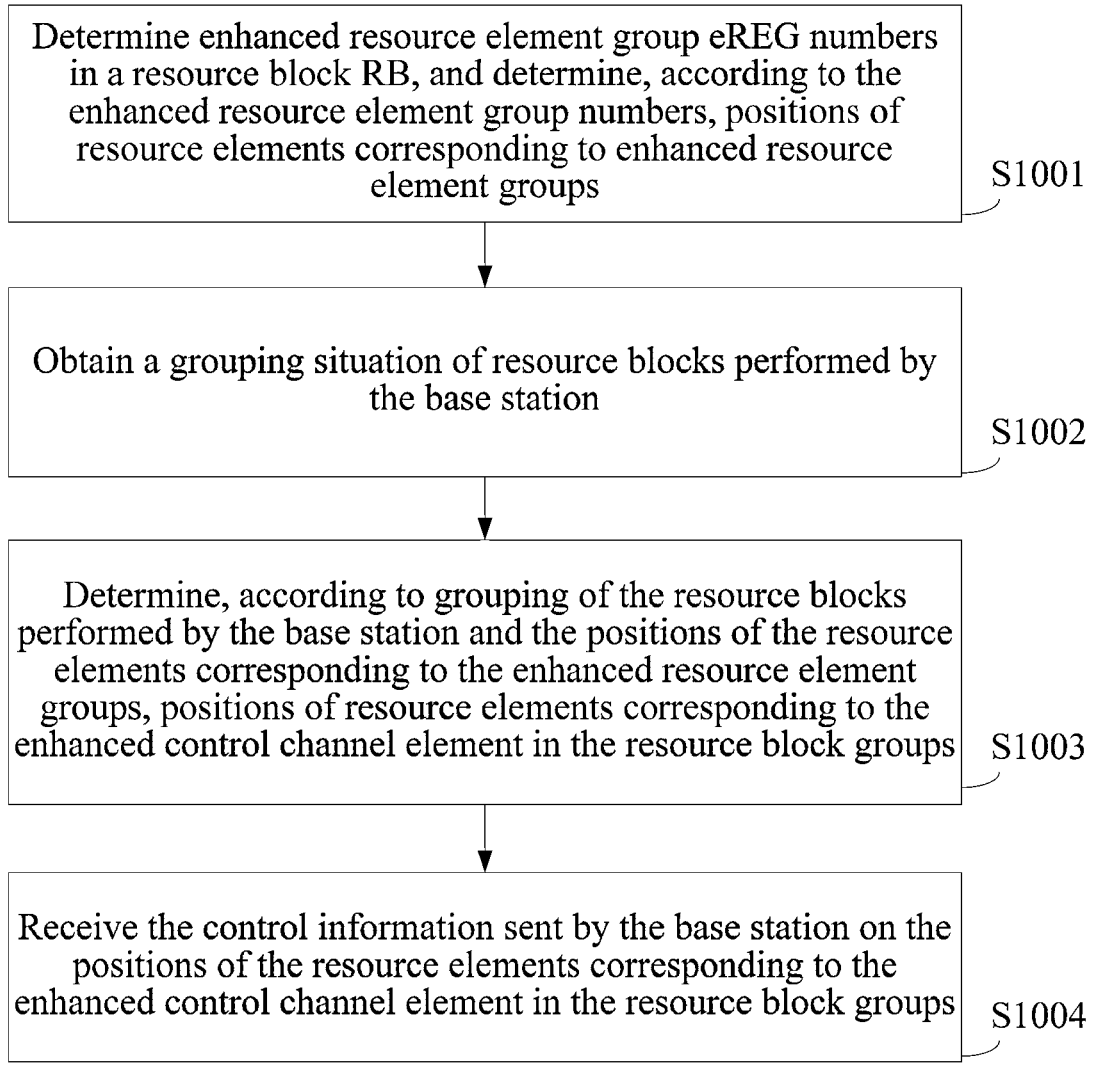
FIG. 10 is a flowchart of a method for transmitting control information provided by Embodiment 9 of the present invention.

An embodiment of the present invention provides a method for transmitting control information, as shown in FIG. 10, including:

This embodiment mainly provides another specific implementation manner, where a terminal device groups resource blocks.

S1001: Determine enhanced resource element group eREG numbers in a resource block RB, and determine, according to the enhanced resource element group numbers, positions of resource elements corresponding to enhanced resource element groups.

It should be noted that, for the specific processing manner that the terminal device UE determines the enhanced resource element group eREG number in the resource block RB, and determines, according to the enhanced resource element group numbers, the positions of the resource elements corresponding to the enhanced resource element groups, reference may be made to the specific implementation manner described in the foregoing embodiments, and details are not repeatedly described herein.

S1002: Obtain a grouping situation of resource blocks performed by a base station.

In this embodiment, the manner that the terminal device obtains the grouping situation of the resource blocks performed by the base station may have a plurality of types, and for the specific processing manner, reference may be made to the specific implementation manner described in the foregoing embodiments, and details are not repeatedly described herein.

S1003: Determine, according to grouping of the resource blocks performed by the base station and the positions of the resource elements corresponding to the enhanced resource element groups, positions of resource elements corresponding to the enhanced control channel element in the resource block groups.

The manner that terminal device determines, according to grouping of the resource blocks performed by the base station and the positions of the resource elements corresponding to the enhanced resource element groups, the positions of the resource elements corresponding to the enhanced control channel element in the resource block groups has a plurality of types, and for the specific processing manner, reference may be made to the specific implementation manner described in the foregoing embodiments, and details are not repeatedly described herein.

S1004: Receive control information sent by the base station on the positions of the resource elements corresponding to the enhanced control channel element in the resource block groups.

Embodiment 10

Figure 11:
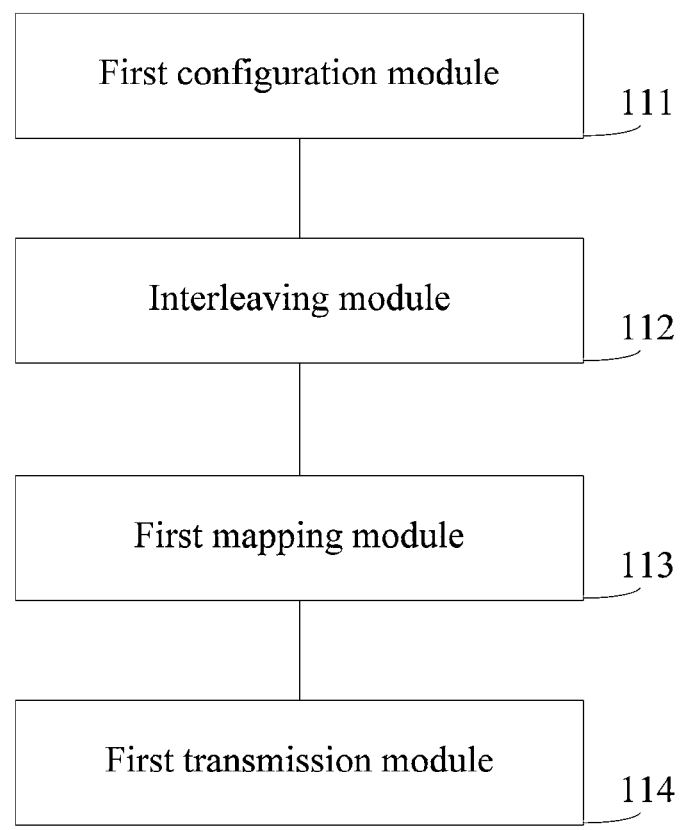
FIG. 11 is a schematic structural diagram of a base station device provided by Embodiment 10 of the present invention.

An embodiment of the present invention provides a method for transmitting control information, as shown in FIG. 11, including:

a first configuration module 111, configured to determine enhanced resource element group eREG numbers in a resource block RB, and determine, according to the enhanced resource element group numbers in the resource block RB, positions of resource elements corresponding to enhanced resource element groups;

an interleaving module 112, configured to interleave the enhanced resource element group numbers, and determine an enhanced control channel element eCCE according to at least two interleaved enhanced resource element groups;

a first mapping module 113, configured to determine, according to the enhanced control channel element and the positions of the resource elements corresponding to the enhanced resource element groups, positions of resource elements corresponding to the enhanced control channel element; and a first transmission module 114, configured to transmit corresponding control information on the positions of the resource elements corresponding to the control channel element.

In the apparatus for transmitting control information provided by this embodiment, before the control information is transmitted, the interleaving module may be configured to interleave the eREGs, so as to configure the eREGs forming the same eCCE to non-adjacent RBs, thereby alleviating a problem that channel frequency diversity is poor, lowering a probability of information loss of a terminal device, and improving performance of a communication system.

Embodiment 11

An embodiment of the present invention provides a base station device, including:

a first configuration module 121, configured to determine enhanced resource element group eREG numbers in a resource block RB, and determine, according to the enhanced resource element group numbers in the resource block RB, positions of resource elements corresponding to enhanced resource element groups;

In this embodiment, as shown in FIG. 12a1, the first configuration module 121 includes:

a first identifying submodule 1211, configured to determine a resource block number;

a first positioning submodule 1212, configured to determine, according to the resource block number and the enhanced resource element group numbers in the resource block, the positions of the resource elements corresponding to the enhanced resource element groups in the resource block.

Figure 12B:
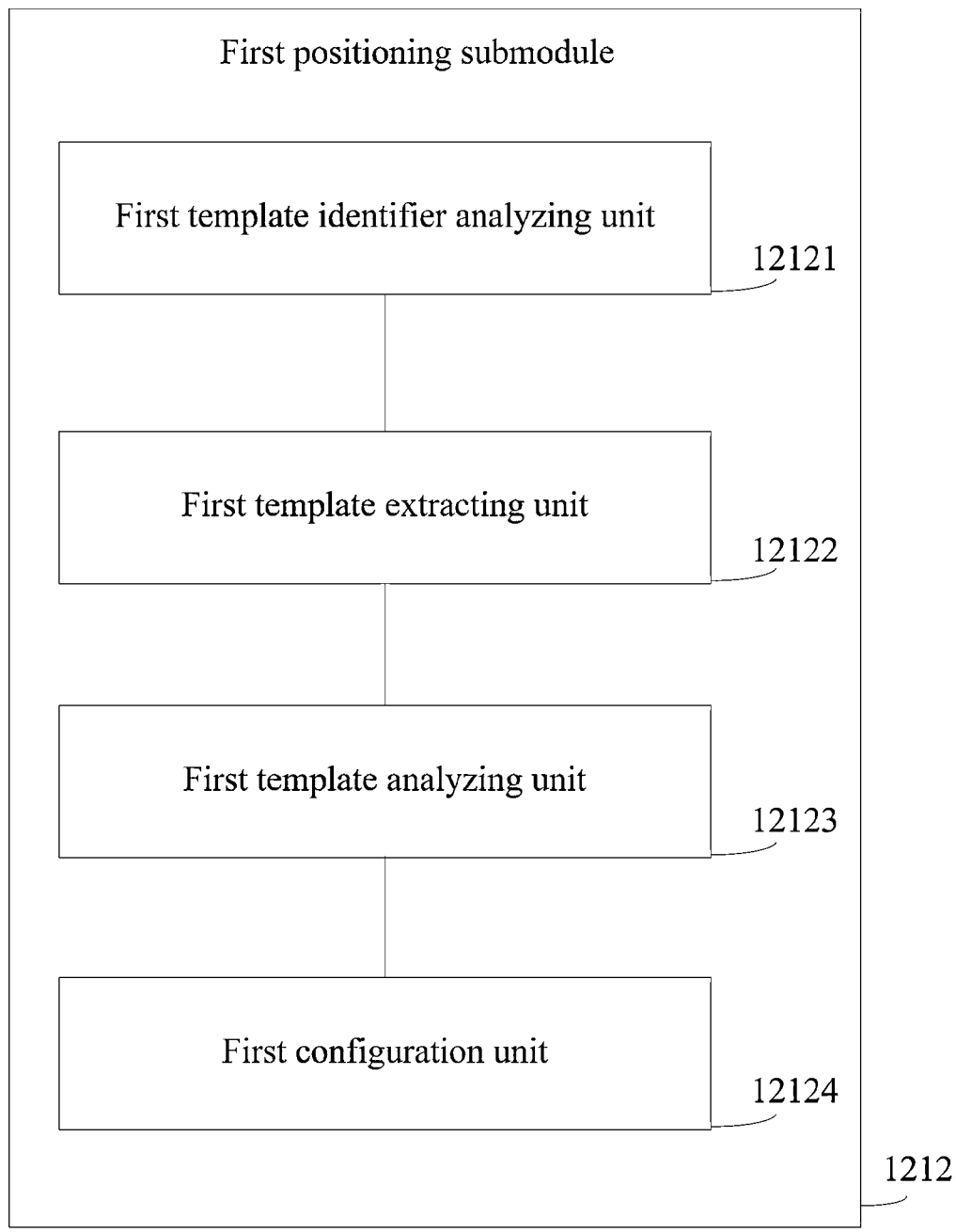
FIG. 12b is a schematic partial structural diagram of an base station device provided by Embodiment 11 of the present invention.

Specifically, as shown in FIG. 12b, the first positioning submodule 1212 includes:

a first template identifier analyzing unit 12121, configured to obtain, according to a preset rule, a template identifier p corresponding to eREGm in $RBn_k$, where the preset rule includes: $p=(A \cdot n_k+m) \bmod M$, where A is a preset positive integer, and M is the number of predefined templates, where $RBn_k$ is a resource block numbered $n_k$; and eREGm is an enhanced resource element group numbered m in $RBn_k$;

a first template extracting unit 12122, configured to obtain a preset template according to the template identifier;

a first template analyzing unit 12123, configured to obtain, according to the preset template, positions of resource elements corresponding to the preset template; and a first configuration unit 12124, configured to determine, according to the positions of the resource elements corresponding to the preset template, the positions of the resource elements corresponding to the enhanced resource element groups in the resource block.

Figure 12C:
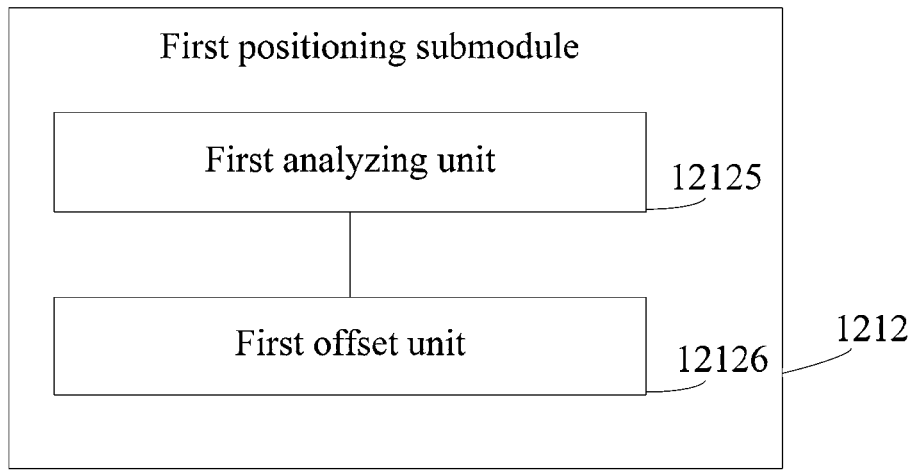
FIG. 12c is a schematic partial structural diagram of another base station device provided by Embodiment 11 of the present invention.

In parallel, optionally, as shown in FIG. 12c, the first positioning submodule 1212 includes:

a first analyzing unit 12125, configured to determine a sub-carrier offset value according to the resource block number; and a first offset unit 12126, configured to determine, according to the sub-carrier offset value, the preset template, and the enhanced resource element group numbers in the resource block, the positions of the resource elements corresponding to the enhanced resource element groups in the resource block.

Optionally, in this embodiment, as shown in FIG. 12a2, the first configuration module 121 includes:

a second identifying submodule 1213, configured to determine a cell identifier; and a second positioning submodule 1214, configured to determine, according to the cell identifier and the enhanced resource element group numbers in the resource block, the positions of the resource elements corresponding to the enhanced resource element groups in the resource block, where the resource block is corresponding to the cell identifier.

Figure 12D:
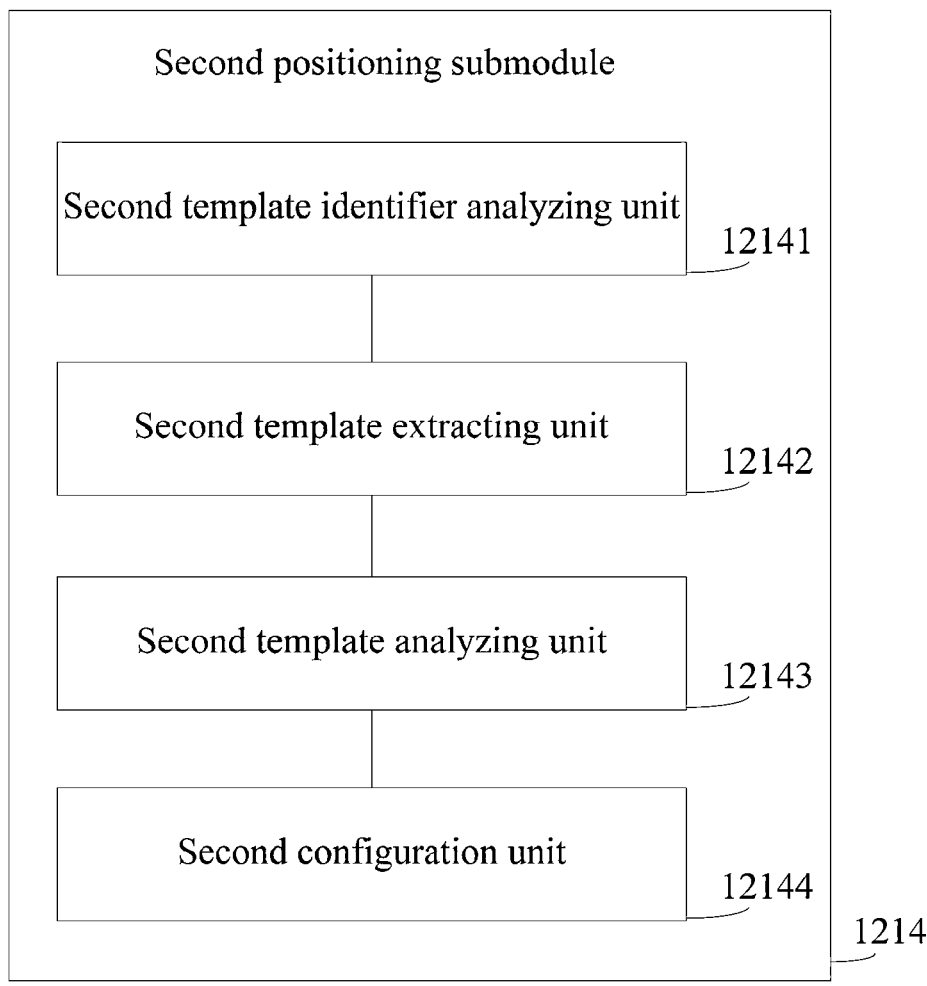
FIG. 12d is a schematic partial structural diagram of still another base station device provided by Embodiment 11 of the present invention.

Specifically, as shown in FIG. 12d, the second positioning submodule 1214 includes:

a second template identifier analyzing unit 12141, configured to obtain, according to a preset rule, a template identifier p of eREGm in a cell with a cell identifier Cell_ID, where the preset rule includes: p=(m+Cell_ID)mod M, where M is the number of predefined templates, where RB $n_k$ is a resource block numbered $n_k$; and eREGm is an enhanced resource element group numbered m in RB $n_k$;

a second template extracting unit 12142, configured to obtain a preset template according to the template identifier;

a second template analyzing unit 12143, configured to obtain, according to the preset template, positions of resource elements corresponding to the preset template; and a second configuration unit 12144, configured to determine, according to the positions of the resource elements corresponding to the preset template, the positions of the resource elements corresponding to the enhanced resource element groups in the resource block, where the resource block is corresponding to the cell identifier.

Figure 12E:
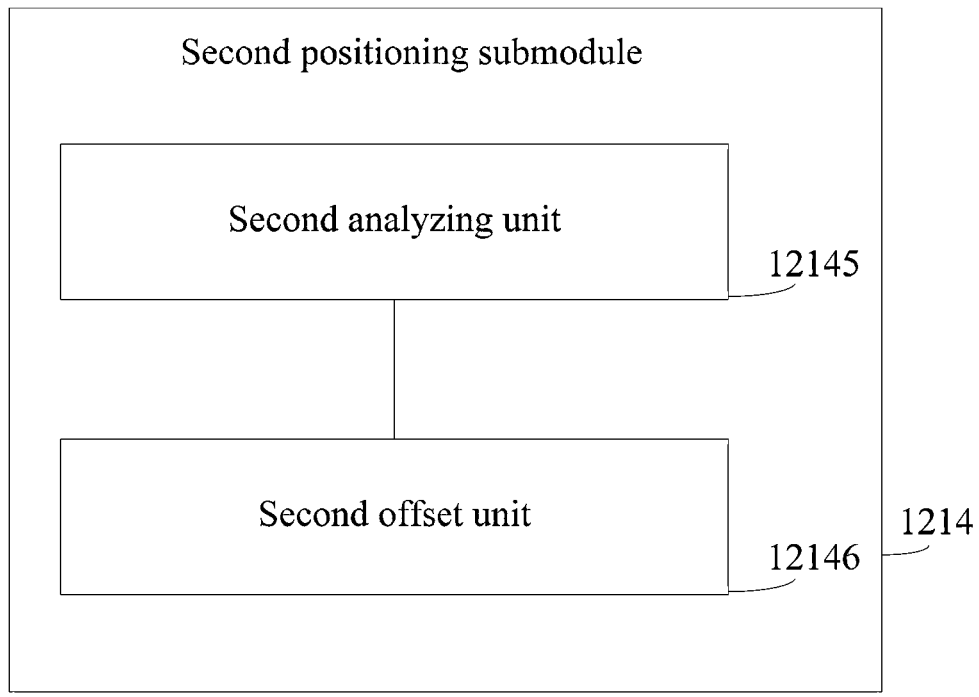
FIG. 12e is a schematic partial structural diagram of still another base station device provided by Embodiment 11 of the present invention.

In parallel, optionally, as shown in FIG. 12e, the second positioning submodule 1214 includes:

a second analyzing unit 12145, configured to determine a sub-carrier offset value according to the cell identifier; and a second offset unit 12146, configured to determine, according to the sub-carrier offset value and the preset template, the positions of the resource elements corresponding to the enhanced resource element groups in the resource block, where the resource block is corresponding to the cell identifier.

an interleaving module 122, configured to interleave the enhanced resource element group numbers, and form an enhanced control channel element eCCE by using at least two interleaved enhanced resource element groups;

In this embodiment, as shown in FIG. 12a3, the interleaving module 122 includes:

a first statistics collecting submodule 1221, configured to obtain the number of enhanced resource elements in one resource block or a preset value; where the first statistics collecting submodule 1221 is further configured to:

obtain the number of enhanced resource elements for ePDCCH distributed transmission in one resource block; or obtain the number of enhanced resource elements for ePD-CCH distributed transmission and the number of virtual enhanced resource elements in one resource block; and an interleaving preprocessing submodule 1222, configured to determine an interleaver; where the number of rows or columns of the interleaver is the number of enhanced resource element groups in one resource block or a multiple of the number; or the number of rows or columns of the interleaver is one of preset 4, 8, 12, 16, and 32; and further, the interleaving preprocessing submodule 1222 is further configured to:

set an inter-row or inter-column displacement pattern to <0, 2, 1, 3> or <0, 4, 2, 6, 1, 5, 3, 7> or <0, 8, 4, 2, 10, 6, 1, 9, 5, 3, 11, 7> or <0, 8, 4, 12, 2, 10, 6, 14, 1, 9, 5, 13, 3, 11, 7, 15> or <1, 17, 9, 25, 5, 21, 13, 29, 3, 19, 11, 27, 7, 23, 15, 31, 0, 16, 8, 24, 4, 20, 12, 28, 2, 18, 10, 26, 6, 22, 14, 30>;

an interleaving submodule 1223, configured to interleave the enhanced resource element group numbers in the resource block according to the interleaver, so as to obtain the interleaved enhanced resource element groups; and a first grouping submodule 1224, configured to obtain, according to a sequence of the interleaved enhanced resource element groups, grouping of the enhanced resource element groups, where each grouping is one eCCE.

Optionally, in this embodiment, as shown in FIG. 12a4, the interleaving module 122 includes:

a first number extracting submodule 1225, configured to obtain enhanced resource element numbers, the number of enhanced resource elements in one resource block, and a resource block number of enhanced resource elements forming one control channel element;

a first renumbering submodule 1226, configured to renumber, according to a preset rule, each enhanced resource element in the enhanced resource elements forming the same control channel element, where the preset rule includes: $n_{2,eREG}=n_{1,eREG} \cdot M+n_{RB}$, where $n_{1,eREG}$ is a number of an enhanced resource element in a resource block, $n_{RB}$ is the resource block number, $n_{2eREG}$ is a new number of the enhanced resource element, M is the number of enhanced resource elements in one resource block; and a second grouping submodule 1227, configured to group, according to a sequence of new numbers of the enhanced resource element groups, the enhanced resource element groups, where each group is one eCCE.

a first mapping module 123, configured to determine, according to the enhanced control channel element and the positions of the resource elements corresponding to the enhanced resource element groups, positions of resource elements corresponding to the enhanced control channel element; and a first transmission module 124, configured to transmit corresponding control information on the positions of the resource elements corresponding to the control channel element.

In the apparatus for transmitting control information provided by this embodiment, the interleaving module may be configured to interleave the eREGs, so as to configure the eREGs forming the same eCCE to non-adjacent RBs, thereby alleviating a problem that channel frequency diversity is poor, lowering a probability of information loss of a terminal device, and improving performance of a communication system; in another aspect, the first configuration module may be configured to reduce the size difference among the enhanced control channel elements, thereby alleviating the problem that when the base station processes the enhanced control element, the base station performs the relatively complex compensation and the control on power

Embodiment 12

Figure 13A:
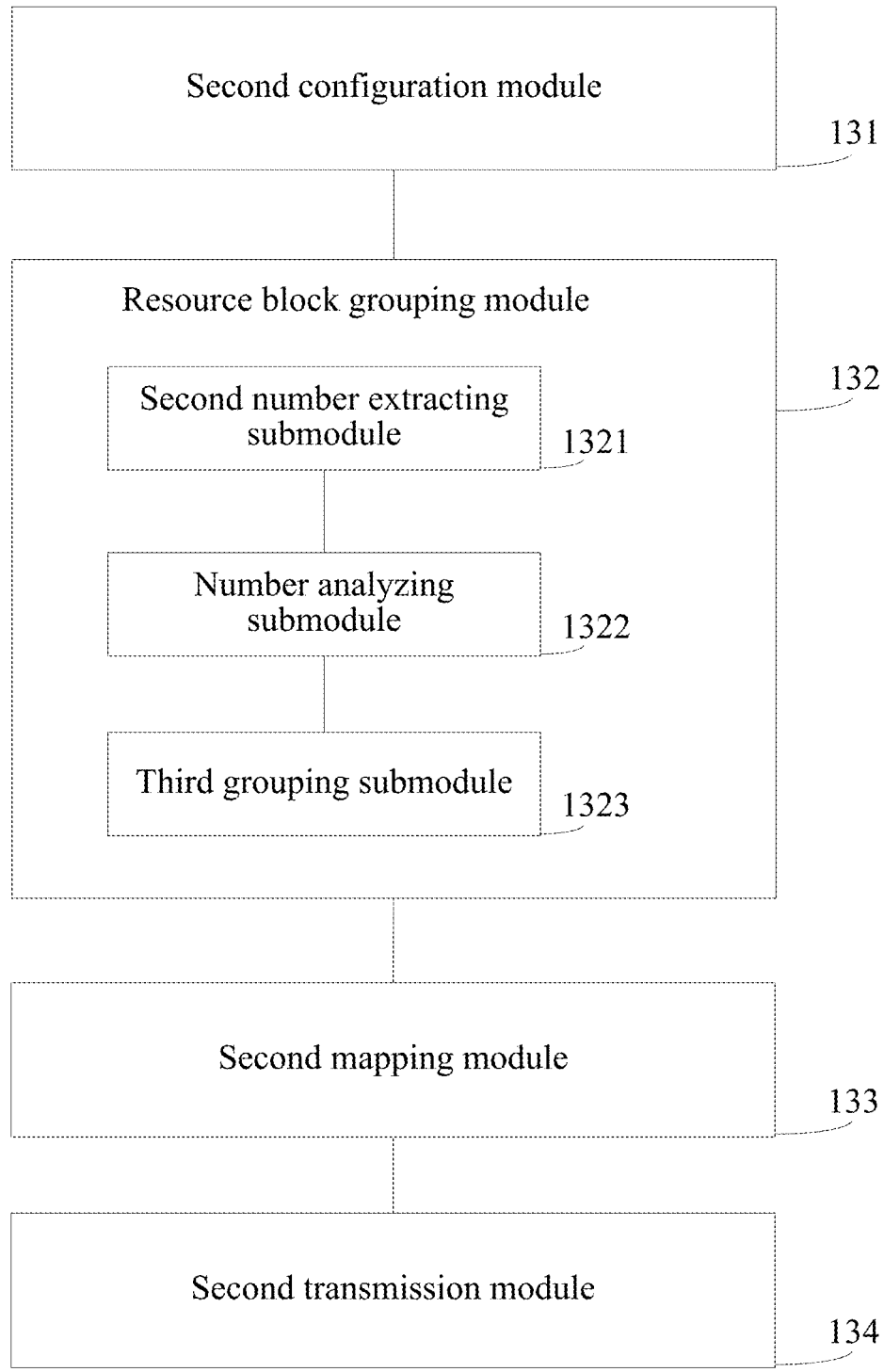
FIG. 13a is a schematic structural diagram of a base station device provided by Embodiment 12 of the present invention.

An embodiment of the present invention provides a base station device, including:

a second configuration module 131, configured to determine enhanced resource element groups eREGs in a resource block RB;

a resource block grouping module 132, configured to group resource blocks;

As shown in FIG. 13a, the resource block grouping module 132 includes:

a second number extracting submodule 1321, configured to determine a virtual resource block DVRB number;

a number analyzing submodule 1322, configured to determine, according to the virtual resource block number, a physical resource block number N corresponding to an even time slot and a physical resource block number M corresponding to an odd time slot; and a third grouping submodule 1323, configured to group the physical resource block number N corresponding to the even time slot and the odd time slot and the physical resource block number M corresponding to the even time slot and the odd time slot into the same group.

Figure 13B:
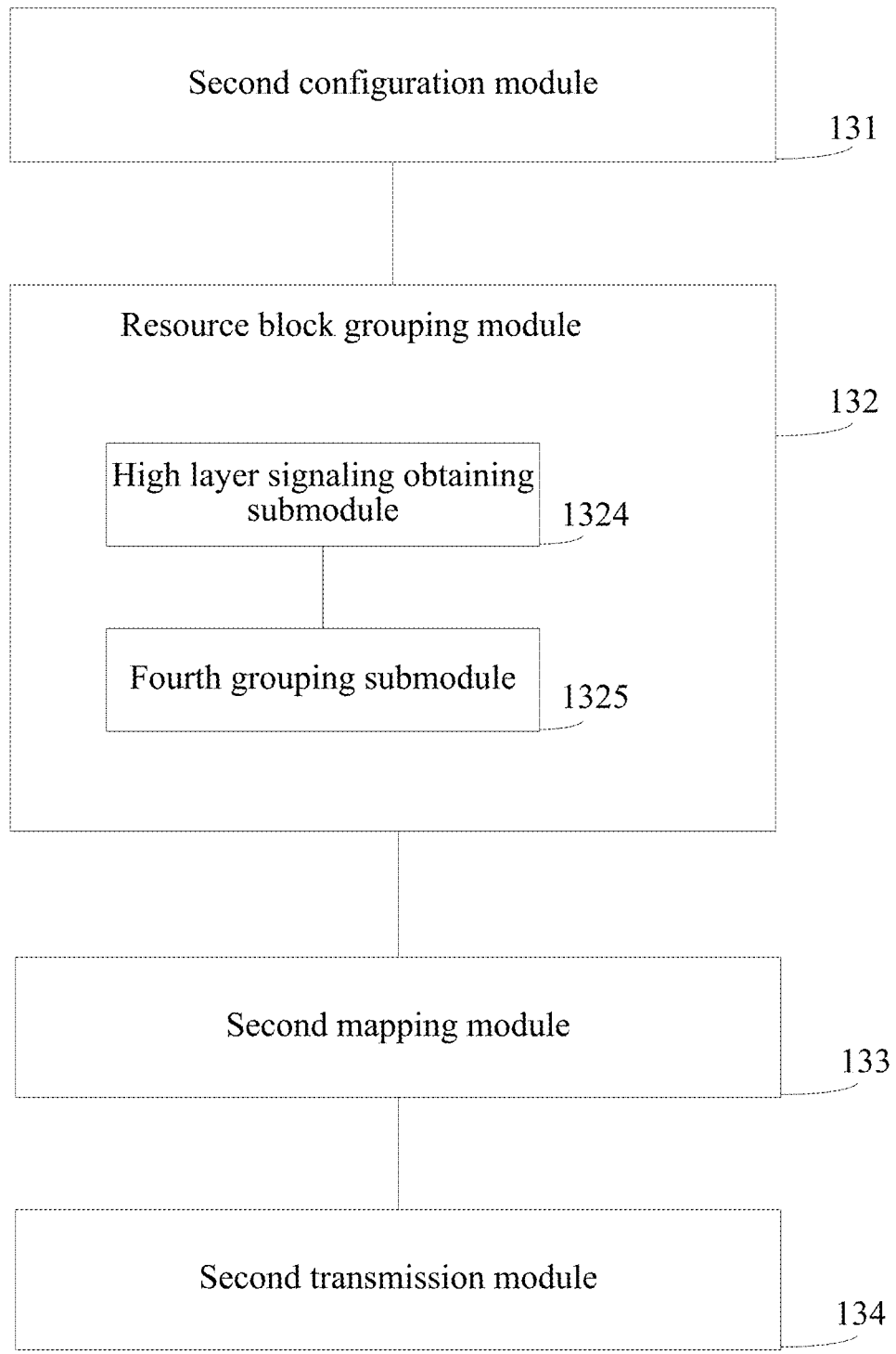
FIG. 13b is a schematic structural diagram of a base station device provided by Embodiment 12 of the present invention.

In parallel, optionally, as shown in FIG. 13b, the resource block grouping module 132 includes:

a high layer signaling obtaining submodule 1324, configured to obtain high layer signaling in a base station, and configure at least two groups of resource blocks according to the high layer signaling; and a fourth grouping submodule 1325, configured to group the at least two groups of resource blocks into one group.

a second mapping module 133, configured to map control information to enhanced resource element groups in the grouped resource blocks; and a second transmission module 134, configured to transmit the mapped control information.

In the apparatus for transmitting control information provided by this embodiment, before the control information is transmitted, the resource block grouping module may be configured to group the RBs, so as to configure the eREGs forming the same eCCE to non-adjacent RBs, thereby alleviating a problem that channel frequency diversity is poor, lowering a probability of information loss of a terminal device, and improving performance of a communication system.

Embodiment 13

Figure 14:
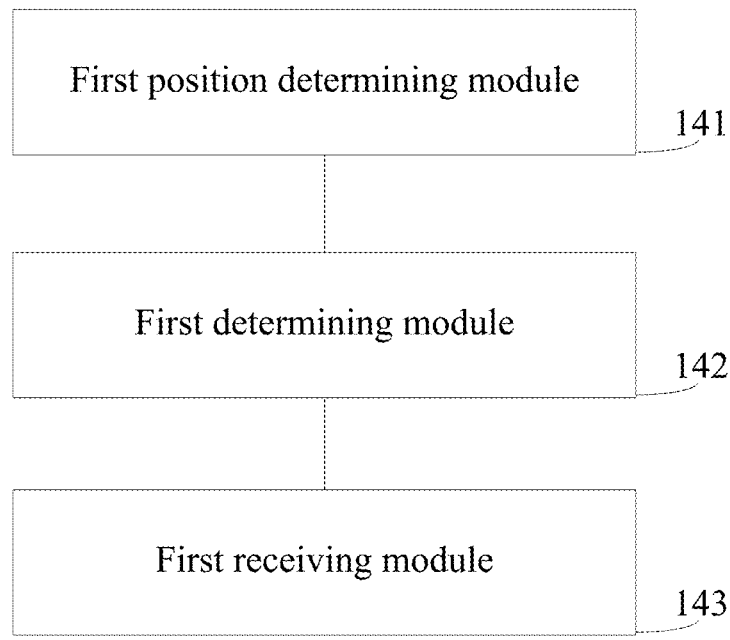
FIG. 14 is a schematic structural diagram of a terminal device provided by Embodiment 13 of the present invention.

An embodiment of the present invention provides a terminal device, as shown in FIG. 14, including:

a first position determining module 141, configured to determine enhanced resource element group eREG numbers in a resource block RB, and determine, according to the enhanced resource element group numbers in the resource block RB, positions of resource elements corresponding to enhanced resource element groups, where it should be noted that the manner that the terminal device UE determines the enhanced resource element group eREG number in the resource block RB, and determines, according to the enhanced resource element group numbers, the positions of the resource elements corresponding to the enhanced resource element groups has a plurality of types, and for the specific processing manner, reference may be made to the specific implementation manner described in the foregoing embodiments, and details are not repeatedly described herein;

a first determining module 142, configured to determine an interleaver of the enhanced resource element group numbers, and determine, according to the interleaver, at least two enhanced resource element groups corresponding to an enhanced control channel element; determine, according to the enhanced control channel element and the positions of the resource elements corresponding to the enhanced resource element groups, positions of resource elements corresponding to the enhanced control channel element, where in this embodiment, for the specific processing manner that the terminal device determines the interleaver, reference may be made to the specific implementation manner described in the foregoing embodiments, and details are not repeatedly described herein;

the manner that the terminal device determines according to the interleaver, at least two enhanced resource element groups corresponding to the enhanced control channel element, and determines, according to the enhanced control channel element and the positions of the resource elements corresponding to the enhanced resource element groups, the positions of the resource elements corresponding to the enhanced control channel element has a plurality of types, and for the specific processing manner, reference may be made to the specific implementation manner described in the foregoing embodiments, and details are not repeatedly described herein; and a first receiving module 143, configured to receive control information sent by a base station on the positions of the resource elements corresponding to the enhanced control channel element.

This embodiment is combined with the apparatus for transmitting control information provided by the foregoing embodiment, the eREGs forming the same eCCE are configured to non-adjacent RBs, thereby alleviating a problem that channel frequency diversity is poor, lowering a probability of information loss of a terminal device, and improving performance of a communication system.

Embodiment 14

Figure 15:
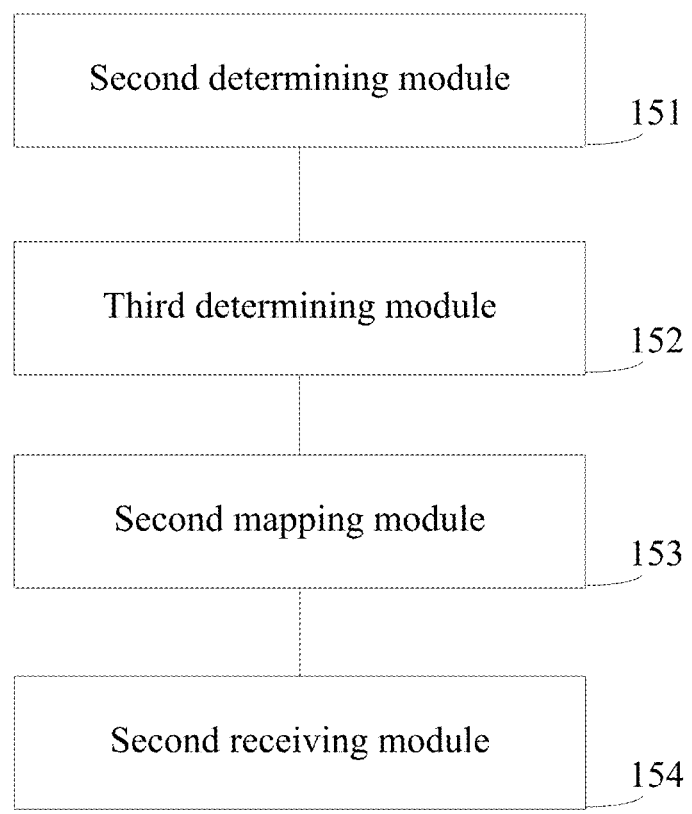
FIG. 15 is a schematic structural diagram of a terminal device provided by Embodiment 14 of the present invention.

An embodiment of the present invention provides a terminal device, as shown in FIG. 15, including:

a second determining module 151, configured to determine enhanced resource element group eREG numbers in a resource block RB, and determine, according to the enhanced resource element group numbers, positions of resource elements corresponding to enhanced resource element groups, where it should be noted that the manner that the terminal device UE determines the enhanced resource element group eREG number in the resource block RB, and determines, according to the enhanced resource element group numbers, the positions of the resource elements corresponding to the enhanced resource element groups has a plurality of types, and for the specific processing manner, reference may be made to the specific implementation manner described in the foregoing embodiments, and details are not repeatedly described herein;

a third determining module 152, configured to obtain a grouping situation of the resource blocks performed by a base station;

where it should be noted that the manner that the terminal device UE obtains the grouping situation of the resource blocks performed by the base station has a plurality of types, and for the specific processing manner, reference may be made to the specific implementation manner described in the foregoing embodiments, and details are not repeatedly described herein;

a second mapping module 153, configured to determine, according to grouping of the resource blocks performed by the base station and the positions of the resource elements corresponding to the enhanced resource element groups, positions of resource elements corresponding to an enhanced control channel element in resource block groups, where the manner that the terminal device determines, according to grouping of the resource blocks performed by the base station and the positions of the resource elements corresponding to the enhanced resource element groups, the positions of the resource elements corresponding to the enhanced control channel element in the resource block groups has a plurality of types, and for the specific processing manner, reference may be made to the specific implementation manner described in the foregoing embodiments, and details are not repeatedly described herein; and a second receiving module 154, configured to receive control information sent by the base station on the positions of the resource elements corresponding to the enhanced control channel element in the resource block groups.

In the apparatus for transmitting control information provided by this embodiment, the eREGs forming the same eCCE are configured to non-adjacent RBs, thereby alleviating a problem that channel frequency diversity is poor, lowering a probability of information loss of a terminal device, and improving performance of a communication system.

Embodiment 15

An embodiment of the present invention provides a method for transmitting control information, as shown in FIG. 7, including:

S701: Determine enhanced resource element groups eREGs in a resource block RB.

S702: Group resource blocks.

In this embodiment, a base station may directly group resource blocks, so that the resource blocks where the enhanced resource elements forming an enhanced control channel element are located are non-adjacent. For example: eREG0s forming the eCCE0 are respectively in RB0, RB1, and RB2, and an original arrangement sequence of the RBs in the system is: RB0-RB1-RB2-RB3-RB4-RB5, and the base station may regroup RB0, RB1, and RB2 to change the arrangement sequence of the RBs to RB0-RB3-RB1-RB4-RB2-RB5, so as to implement that RB0, RB1, and RB2 are non-adjacent.

S703: Map control information to the enhanced resource element groups in the grouped resource blocks.

In S703, an optional specific implementation manner includes:

determining that a number of an enhanced control channel element in a resource block numbered $n_{RB}$ corresponding to in an enhanced resource element group numbered $k_{eCCE}$ is $m_{eREG}$, where $m_{eREG}$ includes:

$m_{eREG} = (k_{eCCE} + n_{RB}) \bmod M$; or $m_{eREG} = (k_{eCCE} + n_{RB} + O_{offset}) \bmod M$; or $m_{eREG} = (Q \cdot k_{eCCE} + n_{RB} \cdot P_{offset}) \bmod M$; or $m_{eREG} = (k_{eCCE} + n_{RB} \cdot P_{offset} + O_{offset}) \bmod M$; or $m_{eREG} = (k_{eCCE} + n_{RB} + O_{offset}) \bmod M + M \cdot \lfloor k_{eCCE}/M \rfloor$; or $m_{eREG} = (k_{eCCE} + n_{RB} \cdot P_{offset} + O_{offset}) \bmod M + M \cdot \lfloor k_{eCCE}/M \rfloor$; or $m_{eREG} = (Q \cdot k_{eCCE} + n_{RB} \cdot P_{offset} + O_{offset}) \bmod M + M \cdot \lfloor k_{eCCE}/M \rfloor$ where M is a value determined according to a first parameter value, the first parameter value includes the number of enhanced resource element groups in the enhanced control channel element, the number of resource blocks in the grouped resource blocks, or the number of enhanced resource element groups in the resource blocks, $P_{offset}$ is a second offset value of the enhanced resource element group in the resource block, $O_{offset}$ is a first offset value of the enhanced resource element group in the resource block, Q is a weighting factor of the enhanced control channel element, and $P_{offset}$ or $O_{offset}$ or Q is a predefined positive integer value or a positive integer value configured by high layer control signaling, for example, any predefined positive integer value between 0 and M.

Further, for example, $k_{eCCE}$ is 0-15, $n_R$ is 0-3, $m_{eREG}$ is 0-15, M is 16, $O_{offset}$ is 0, that is, one eCCE includes 4 eREGs. According to $m_{eREG} = (k_{eCCE} + O_{offset}) \bmod M + M \cdot \lfloor k_{eCCE}/M \rfloor$, eREGs in the grouped resource blocks corresponding to the eCCEs in Table 8 in the following may be obtained.

TABLE 8

|  | RB 0 | RB 1 | RB 2 | RB 3 |
| --- | --- | --- | --- | --- |
| eCCE 0 | eREG 0 | eREG 1 | eREG 2 | eREG 3 |
| eCCE 1 | eREG 1 | eREG 2 | eREG 3 | eREG 0 |
| eCCE 2 | eREG 2 | eREG 3 | eREG 0 | eREG 1 |
| eCCE 3 | eREG 3 | eREG 0 | eREG 1 | eREG 2 |
| eCCE 4 | eREG 4 | eREG 5 | eREG 6 | eREG 7 |
| eCCE 5 | eREG 5 | eREG 6 | eREG 7 | eREG 4 |
| eCCE 6 | eREG 6 | eREG 7 | eREG 4 | eREG 5 |
| eCCE 7 | eREG 7 | eREG 4 | eREG 5 | eREG 6 |
| eCCE 8 | eREG 8 | eREG 9 | eREG 10 | eREG 11 |
| eCCE 9 | eREG 9 | eREG 10 | eREG 11 | eREG 8 |
| eCCE 10 | eREG 10 | eREG 11 | eREG 8 | eREG 9 |
| eCCE 11 | eREG 11 | eREG 8 | eREG 9 | eREG 10 |
| eCCE 12 | eREG 12 | eREG 13 | eREG 14 | eREG 15 |
| eCCE 13 | eREG 13 | eREG 14 | eREG 15 | eREG 12 |
| eCCE 14 | eREG 14 | eREG 15 | eREG 12 | eREG 13 |
| eCCE 15 | eREG 15 | eREG 12 | eREG 13 | eREG 14 |

In the foregoing manner, a result obtained according to another formula and parameter value may be obtained, and details are not repeatedly described. In this embodiment, that the eREGs corresponding to the eCCE in the grouped resource blocks are represented in a form of formula is equivalent to that the eREGs corresponding to the eCCE in the grouped resource blocks are represented in a form of table.

By using the foregoing method, the enhanced resource element group numbers corresponding to one or more enhanced control channel elements with different numbers in the grouped resource blocks are determined, and the control information is mapped to the enhanced resource element groups in the grouped resource blocks corresponding to one or more enhanced control channel elements.

S704: Transmit the mapped control information.

In the method for transmitting control information provided by the present invention, before transmitting control information, the base station groups the eREGs, so as to configure the eREGs forming the same eCCE to non-adjacent RBs, thereby alleviating a problem that channel frequency diversity is poor, lowering a probability of information loss of a terminal device, and improving performance of a communication system.

The embodiments in the specification are described in a progressive manner; for the identical or similar parts of the embodiments, reference may be made to each other; the focus of the description in each embodiment is the difference from another embodiment. In particular, the device embodiments are basically similar to the method embodiments, and therefore are described very briefly. For the associated parts, reference may be made to the description in the method embodiments.

A person of ordinary skill in the art may understand that all or a part of the steps of the methods in the foregoing embodiments may be implemented by a computer program instructing relevant hardware. The program may be stored in a computer readable storage medium. When the program runs, the steps of the foregoing methods in the embodiments are performed. The storage medium may be a magnetic disk, an optical disc, a read-only memory (Read-Only Memory, ROM), a random access memory (Random Access Memory, RAM), or the like.

The foregoing description is merely specific implementation manners of the present invention, but is not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for transmitting control information, comprising:
    determining, by a base station device, enhanced resource element groups (eREGs) in a resource block (RB);
    grouping, by the base station device, resource blocks;
    determining an enhanced control channel element;
    determining, according to an enhanced control channel element number, a resource block number, and a quantity of enhanced resource element groups in the resource blocks, the enhanced resource element groups in the grouped resource blocks corresponding to the enhanced control channel element;
        mapping the control information to the enhanced resource element groups in the grouped resource blocks corresponding to the at least one enhanced control channel element;
    transmitting, by the base station device, the mapped control information;
    wherein determining the eREGs in the grouped resource blocks corresponding to the enhanced control channel element comprises one of the following:
    a number of an enhanced control channel element numbered $k_{eCCE}$ in an enhanced resource element group in a resource block numbered $n_{RB}$ is $m_{eREG}$, wherein $m_{eREG}$ comprises:
    $m_{eREG} = (k_{eCCE} + n_{RB}) \bmod M$;
    $m_{eREG} = (k_{eCCE} + n_{RB} + O_{offset}) \bmod M$;
    $m_{eREG} = (Q \cdot k_{eCCE} + n_{RB} \cdot P_{offset}) \bmod M$; and
    $m_{eREG} = (k_{eCCE} + n_{RB} \cdot P_{offset} + O_{offset}) \bmod M$;
    wherein M is a value determined according to the quantity of enhanced resource element groups in the resource blocks, $O_{offset}$ is a first offset value of the enhanced resource element group in the resource block, $P_{offset}$ is a second offset value of the enhanced resource element group in the resource block, Q is a weighting factor of the enhanced control channel element, and $P_{offset}$ or $O_{offset}$ or Q is any predefined positive integer value between 0 and M or a positive integer value configured by high layer control signaling.

2. The method for transmitting control information according to claim 1, wherein grouping the resource blocks comprises:
    obtaining, high layer signaling in a base station, and configuring at least two resource blocks according to the high layer signaling; and
    grouping, the at least two resource blocks into one group.

3. The method for transmitting control information according to claim 1, wherein determining the eREGs in the grouped resource blocks corresponding to the enhanced control channel element comprises:
    determining, according to the enhanced control channel element number, the resource block number, an offset value of the enhanced resource element groups in the resource blocks, and a first parameter value, the enhanced resource element groups in the grouped resource blocks corresponding to the enhanced control channel element;
    wherein the first parameter value comprises one of a quantity of eREGs in the enhanced control channel element, a quantity of resource blocks in the grouped resource blocks, and the quantity of eREGs in the resource blocks.

4. The method for transmitting control information according to claim 1, wherein determining, according to the enhanced control channel element, the enhanced resource element groups in the grouped resource blocks corresponding to the enhanced control channel element comprises:
    determining, according to an enhanced control channel element number, a resource block number, and an offset value of the enhanced resource element groups in the resource blocks, the enhanced resource element groups in the grouped resource blocks corresponding to the enhanced control channel element.

5. A method for transmitting control information, comprising:
    determining, by a terminal device, enhanced resource element group (eREG) numbers in a resource block (RB), and determining, according to the eREG numbers, positions of resource elements corresponding to eREGs;
    obtaining, by the terminal device, a grouping situation of the resource blocks performed by a base station;
    determining, according to grouping of the resource blocks performed by the base station and the positions of the resource elements corresponding to the eREGs, positions of resource elements corresponding to an enhanced control channel element in resource block groups; and
    receiving, by the terminal device, control information sent by the base station on the positions of the resource elements corresponding to the enhanced control channel element in the resource block groups;
    wherein determining the positions of the resource elements corresponding to the enhanced control channel element in the resource block groups further comprises:
    determining that a number of an enhanced control channel element numbered $k_{eCCE}$ in an enhanced resource element group in a resource block numbered $n_{RB}$ is $m_{eREG}$, wherein $m_{eREG}$ comprises one of the following:
    $m_{eREG} = (k_{eCCE} + n_{RB}) \bmod M$;
    $m_{eREG} = (k_{eCCE} + n_{RB} + O_{offset}) \bmod M$;
    $m_{eREG} = (Q \cdot k_{eCCE} n_{RB} \cdot P_{offset}) \bmod M$; and
    $m_{eREG} = (k_{eCCE} + n_{RB} \cdot P_{offset} + O_{offset}) \bmod M$;

wherein M is a value determined according to the quantity of enhanced resource element groups in the resource blocks, $P_{offset}$ is a second offset value of the eREG in the resource block, $O_{offset}$ is a first offset value of the eREG in the resource block, Q is a weighting factor of the enhanced control channel element, and $P_{offset}$ or $O_{offset}$ or Q is any predefined positive integer value between 0 and M or a positive integer value configured by high layer control signaling.

6. The method according to claim 5, wherein determining the positions of resource elements corresponding to the enhanced control channel element in the resource block groups comprises:
  determining, according to an enhanced control channel element number, a resource block number, and a quantity of eREGs in the resource blocks, the eREGs in the resource block groups corresponding to the enhanced control channel element; and
  determining, according to the eREGs in the resource block groups corresponding to the enhanced control channel element, and the positions of the resource elements corresponding to the eREGs, the positions of the resource elements corresponding to the enhanced control channel element in the resource block groups.

7. The method according to claim 6, wherein determining the eREGs in the grouped resource blocks corresponding to the enhanced control channel element comprises:
  determining, according to the enhanced control channel element number, the resource block number, an offset value of the enhanced resource element groups in the resource blocks, and a first parameter value, the enhanced resource element groups in the grouped resource blocks corresponding to the enhanced control channel element;
  wherein the first parameter value comprises one of (a) a quantity of enhanced resource element groups in the enhanced control channel element, (b) a quantity of resource blocks in the grouped resource blocks, and (c) the quantity of eREGs in the resource blocks.

8. The method according to claim 5, wherein determining the positions of resource elements corresponding to the enhanced control channel element in the resource block groups comprises:
  determining, according to an enhanced control channel element number, a resource block number, and an offset value of the eREGs in the resource blocks, the eREGs in the grouped resource blocks corresponding to the enhanced control channel element; and
  determining, according to the eREGs in the resource block groups corresponding to the enhanced control channel element, and the positions of the resource elements corresponding to the eREGs, the positions of the resource elements corresponding to the enhanced control channel element in the resource block groups.

9. A base station device, comprising:
  a processor; and
  a memory coupled to the processor, the memory comprising instructions that, when executed by the processor, cause the network device to:

determine enhanced resource element groups (eREGs) in a resource block (RB);
group resource blocks;
determine an enhanced control channel element;
determine, according to an enhanced control channel element number, a resource block number, and a quantity of enhanced resource element groups in the resource blocks, the enhanced resource element groups in the grouped resource blocks corresponding to the enhanced control channel element;
map control information to the enhanced resource element groups in the grouped resource blocks corresponding to the at least one enhanced control channel element;
transmit the mapped control information
wherein determining the eREGs in the grouped resource blocks corresponding to the enhanced control channel element comprises one of the following:
a number of an enhanced control channel element numbered $k_{eCCE}$ in an enhanced resource element group in a resource block numbered $n_{RB}$ is $m_{eREG}$, wherein $m_{eREG}$ comprises:
$m_{eREG} = (k_{eCCE} + n_{RB}) \mod M$;
$m_{eREG} = (k_{eCCE} + n_{RB} + O_{offset}) \mod M$;
$m_{eREG} = (Q \cdot k_{eCCE} + n_{RB} \cdot P_{offset}) \mod M$; and
$m_{eREG} = (k_{eCCE} + n_{RB} \cdot P_{offset} + O_{offset}) \mod M$;
wherein M is a value determined according to the quantity of enhanced resource element groups in the resource blocks, $O_{offset}$ is a first offset value of the enhanced resource element group in the resource block, $P_{offset}$ is a second offset value of the enhanced resource element group in the resource block, Q is a weighting factor of the enhanced control channel element, and $P_{offset}$ or $O_{offset}$ or Q is any predefined positive integer value between 0 and M or a positive integer value configured by high layer control signaling.

10. The base station device according to claim 9, wherein the memory further comprises instructions that, when executed by the processor, cause the network device to:
  determine a virtual resource block (DVRB) number;
  determine, according to the virtual resource block number, a physical resource block number N corresponding to an even time slot and a physical resource block number M corresponding to an odd time slot; and
  group the physical resource block number N corresponding to the even time slot and the odd time slot and the physical resource block number M corresponding to the even time slot and the odd time slot into the same group.

11. The base station device according to claim 9, wherein the memory further comprises instructions that, when executed by the processor, cause the network device to:
  obtain high layer signaling in a base station, and configure at least two groups of resource blocks according to the high layer signaling; and
  group the at least two groups of resource blocks into one group.

* * * * *